United States Patent
Rico Alvarino et al.

(10) Patent No.: US 11,438,748 B2
(45) Date of Patent: Sep. 6, 2022

(54) NARROWBAND REFERENCE SIGNAL CONFIGURATION FOR NON-ANCHOR CARRIERS

(71) Applicant: QUALCOMM Incorporated, San Diego, CA (US)

(72) Inventors: Alberto Rico Alvarino, San Diego, CA (US); Le Liu, Fremont, CA (US)

(73) Assignee: QUALCOMM Incorporated, San Diego, CA (US)

(*) Notice: Subject to any disclaimer, the term of this patent is extended or adjusted under 35 U.S.C. 154(b) by 39 days.

(21) Appl. No.: 17/035,647

(22) Filed: Sep. 28, 2020

(65) Prior Publication Data

US 2021/0120390 A1    Apr. 22, 2021

Related U.S. Application Data

(60) Provisional application No. 62/916,082, filed on Oct. 16, 2019.

(51) Int. Cl.
  *H04W 4/80* (2018.01)
  *H04L 5/00* (2006.01)
  (Continued)

(52) U.S. Cl.
  CPC ............ *H04W 4/80* (2018.02); *H04L 5/0051* (2013.01); *H04W 8/24* (2013.01); *H04W 68/005* (2013.01);
  (Continued)

(58) Field of Classification Search
  CPC ......... H04W 8/22; H04W 8/24; H04W 76/00; H04W 76/10; H04W 76/11; H04W 74/08;
  (Continued)

(56) References Cited

U.S. PATENT DOCUMENTS

2013/0016841 A1* 1/2013 Fong ................. H04L 25/03866
                                                        380/287
2014/0302856 A1* 10/2014 Nory ................. H04W 52/0206
                                                        455/437
(Continued)

FOREIGN PATENT DOCUMENTS

CN        107046458 A      8/2017
EP         3468125 A1      4/2019
(Continued)

OTHER PUBLICATIONS

"1 Introduction 2 NB-IoT", 3GPP Draft, NB_IoT_EMTC_ENH Phase 1_ALLV2, 3rd Generation Partnership Project (3GPP), Mobile Competence Centre; 650, Route Des Lucioles; F-06921 Sophia-Antipolis Cedex; France, Sep. 18, 2019 (Sep. 18, 2019), XP051779543, 63 Pages, Retrieved from the Internet: URL: http://www.3gpp.org/ftp/Meetings_3GPP_SYNC/RAN/joint_RAN_SA/RAN_inputs/RP-192291.zip, [retrieved on Sep. 18, 2019], Section 2.7.
(Continued)

*Primary Examiner* — Warner Wong
(74) *Attorney, Agent, or Firm* — Qualcomm Incorporated

(57) ABSTRACT

The described techniques relate to methods, systems, devices, and apparatuses that support narrowband reference signal (NRS) configuration for non-anchor carriers. Generally, the described techniques provide for increasing the length of an NRS scrambling sequence for non-anchor carriers. For example, the NRS scrambling sequence initialization equation may be a function of system frame number. A base station may transmit to a user equipment (UE) a non-anchor carrier configuration indicating that the NRS scrambling sequence is extended with respect to other NRS scrambling sequences. For example, the non-anchor carrier configuration may indicate the scrambling sequence initialization for the NRS. In some examples, the length of the NRS scrambling sequence is increased by extending the
(Continued)

number of possible initializations. The base station and UE may communicate based on the extended length of the NRS scrambling sequence for non-anchor carriers of the NRS.

28 Claims, 17 Drawing Sheets

(51) Int. Cl.
| | |
|---|---|
| *H04W 72/04* | (2009.01) |
| *H04W 74/08* | (2009.01) |
| *H04W 68/00* | (2009.01) |
| *H04W 76/11* | (2018.01) |
| *H04W 8/24* | (2009.01) |

(52) U.S. Cl.
CPC ... *H04W 72/0466* (2013.01); *H04W 74/0833* (2013.01); *H04W 76/11* (2018.02)

(58) Field of Classification Search
CPC .......... H04W 74/0833; H04W 72/044; H04W 72/0466; H04W 7/0004; H04W 68/00; H04W 68/005; H04W 4/00; H04W 4/80; H04W 2025/03656

See application file for complete search history.

(56) References Cited

U.S. PATENT DOCUMENTS

| | | | |
|---|---|---|---|
| 2018/0124644 A1 | 5/2018 | Rico et al. | |
| 2019/0253231 A1* | 8/2019 | Park | H04L 5/1469 |
| 2019/0313268 A1* | 10/2019 | Ananda | H04W 24/08 |
| 2020/0374083 A1* | 11/2020 | Wang | B63B 32/70 |
| 2020/0383072 A1* | 12/2020 | Chauhan | H04L 5/0051 |
| 2021/0329591 A1* | 10/2021 | Hwang | H04W 68/005 |

FOREIGN PATENT DOCUMENTS

| | | | | |
|---|---|---|---|---|
| WO | WO2020145799 | * | 1/2020 | H04B 17/373 |
| WO | WO2020/145800 | * | 7/2020 | H04B 7/06 |

OTHER PUBLICATIONS

Ericsson: "NB-IoT Paging on Non-Anchor PRBs", 3GPP Draft; 3GPP TSG-RAN WG1 #86bis, R1-1608704, NB-IoT Paging on Non-Anchor PRBs, 3rd Generation Partnership Project (3GPP), Mobile Competence Centre, 650 Route Des Lucioles, F-06921, Sophia-Antipolis Cedex; France, vol. RAN WG1, No. Lisbon, Portugal, Oct. 10, 2016-Oct. 14, 2016, Oct. 9, 2016 (Oct. 9, 2016), XP051148762, Retrieved from the Internet: URL:http://www.3gpp.org/ftp/Meetings_3GPP_SYNC/RAN1/Docs/, pp. 1-5, [retrieved on Oct. 9, 2016].

International Search Report and Written Opinion—PCT/US2020/053242—ISAEPO—dated Nov. 18, 2020.

* cited by examiner

NARROWBAND REFERENCE SIGNAL CONFIGURATION FOR NON-ANCHOR CARRIERS

CROSS REFERENCE

The present Applications for Patent claims the benefit of U.S. Provisional Patent Application No. 62/916,082 by RICO ALVARINO et al., entitled "NARROWBAND REFERENCE SIGNAL CONFIGURATION FOR NON-ANCHOR CARRIERS," filed Oct. 16, 2019, assigned to the assignee hereof, and expressly incorporated by reference herein.

FIELD OF TECHNOLOGY

The following relates generally to wireless communications and more specifically to narrowband reference signal configuration for non-anchor carriers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may communicate with a wireless device (e.g., a UE) using one or more cells. In some cases, the UE may receive a narrowband reference signal (NRS) from multiple cells that collide. Such collisions may cause performance degradation in a wireless communications system.

SUMMARY

The described techniques relate to improved methods, systems, devices, and apparatuses that support narrowband reference signal configuration for non-anchor carriers. Generally, the described techniques provide for increasing the length of an NRS scrambling sequence (e.g., from one radio frame to several radio frames) for non-anchor carriers. For example, the NRS scrambling sequence initialization equation may be a function of system frame number. The base station may transmit to the UE a non-anchor carrier configuration indicating that the NRS scrambling sequence is extended with respect to other NRS scrambling sequences (e.g., an NRS scrambling sequence associated with an anchor carrier). For example, the non-anchor carrier configuration may indicate the scrambling sequence initialization for the NRS. In some examples, the length of the NRS scrambling sequence is increased by extending the number of possible initializations. The non-anchor carrier configuration may be enabled by UE capability messages or network configuration. For example, the UE may send an indication of the UE capability to the base station and the base station may configure the UE in the non-anchor carrier. The base station and UE may communicate based on the extended length of the NRS scrambling sequence for non-anchor carriers of the NRS.

A method of wireless communications at a UE is described. The method may include identifying a first narrowband reference signal associated with an anchor carrier, where a scrambling of the first narrowband reference signal is based on a first scrambling initialization, receiving a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization, and communicating with a base station over the non-anchor carrier based on the second narrowband reference signal.

An apparatus for wireless communications at a UE is described. The apparatus may include a processor, memory coupled with the processor, and instructions stored in the memory. The instructions may be executable by the processor to cause the apparatus to identify a first narrowband reference signal associated with an anchor carrier, where a scrambling of the first narrowband reference signal is based on a first scrambling initialization, receive a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization, and communicate with a base station over the non-anchor carrier based on the second narrowband reference signal.

Another apparatus for wireless communications at a UE is described. The apparatus may include means for identifying a first narrowband reference signal associated with an anchor carrier, where a scrambling of the first narrowband reference signal is based on a first scrambling initialization, receiving a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization, and communicating with a base station over the non-anchor carrier based on the second narrowband reference signal.

A non-transitory computer-readable medium storing code for wireless communications at a UE is described. The code may include instructions executable by a processor to identify a first narrowband reference signal associated with an anchor carrier, where a scrambling of the first narrowband reference signal is based on a first scrambling initialization, receive a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization, and communicate with a base station over the non-anchor carrier based on the second narrowband reference signal.

Some examples of the method, apparatuses, and non-transitory computer-readable medium described herein may further include operations, features, means, or instructions for transmitting a capability message indicating a capability to support the scrambling of the second narrowband reference signal based on the second scrambling initialization, where receiving the carrier configuration for the non-anchor carrier may be based on the capability message.

Some examples of the method, apparatuses, and non-transitory computer-readable medium described herein may further include operations, features, means, or instructions for receiving an indication associated with a set of non-anchor carriers for paging, where the indication associated with the set of non-anchor carriers for paging indicates that a subset of the set of non-anchor carriers for paging may be scrambled based on the second scrambling initialization.

Some examples of the method, apparatuses, and non-transitory computer-readable medium described herein may further include operations, features, means, or instructions for selecting a non-anchor carrier for paging from the set of non-anchor carriers for paging based on a UE capability, a scrambling initialization type of the non-anchor carrier for paging, an identifier of the UE, or a combination thereof.

Some examples of the method, apparatuses, and non-transitory computer-readable medium described herein may further include operations, features, means, or instructions for receiving an indication associated with a set of non-anchor carriers for random access, where the indication associated with the set of non-anchor carriers for random access indicates that a subset of the set of non-anchor carriers for random access may be scrambled based on the second scrambling initialization.

Some examples of the method, apparatuses, and non-transitory computer-readable medium described herein may further include operations, features, means, or instructions for selecting a non-anchor carrier for random access from the set of non-anchor carriers for random access based on a UE capability.

Some examples of the method, apparatuses, and non-transitory computer-readable medium described herein may further include operations, features, means, or instructions for receiving a system information message, where the system information message indicates a scrambling initialization type for a narrowband reference signal for a carrier associated with a multicast control channel.

Some examples of the method, apparatuses, and non-transitory computer-readable medium described herein may further include operations, features, means, or instructions for receiving an indication associated with the multicast control channel, where the indication associated with the multicast control channel indicates a scrambling initialization type for a narrowband reference signal for a non-anchor carrier associated with a multicast traffic channel.

In some examples of the method, apparatuses, and non-transitory computer-readable medium described herein, the non-anchor carrier includes an aggregation of two physical resource blocks, where the carrier configuration for the non-anchor carrier indicates the scrambling of the second narrowband reference signal by configuring the non-anchor carrier as an aggregation of two physical resource blocks.

In some examples of the method, apparatuses, and non-transitory computer-readable medium described herein, a first physical resource block of the non-anchor carrier may be associated with a narrowband reference signal having a scrambling based on the first scrambling initialization, and a second physical resource block of the non-anchor carrier may be associated with a narrowband reference signal having a scrambling based on the second scrambling initialization.

In some examples of the method, apparatuses, and non-transitory computer-readable medium described herein, a first physical resource block and a second physical resource block of the non-anchor carrier may be associated with a narrowband reference signal having a scrambling based on the second scrambling initialization.

In some examples of the method, apparatuses, and non-transitory computer-readable medium described herein, the second scrambling initialization may be initialized once per symbol and mapped to the narrowband reference signal on both physical resource blocks.

In some examples of the method, apparatuses, and non-transitory computer-readable medium described herein, the second scrambling initialization may be initialized separately for each physical resource block based on a carrier identifier and mapped separately for each physical resource block.

Some examples of the method, apparatuses, and non-transitory computer-readable medium described herein may further include operations, features, means, or instructions for receiving the second narrowband reference signal, where a scrambling of the second narrowband reference signal may be based on the second scrambling initialization.

In some examples of the method, apparatuses, and non-transitory computer-readable medium described herein, the second scrambling initialization may be based on a system frame number.

In some examples of the method, apparatuses, and non-transitory computer-readable medium described herein, the first scrambling initialization may be associated with a first periodicity and the second scrambling initialization may be associated with a second periodicity, where the second periodicity may be greater than the first periodicity.

A method of wireless communications at a base station is described. The method may include identifying a first narrowband reference signal associated with an anchor carrier, where a scrambling of the first narrowband reference signal is based on a first scrambling initialization, transmitting a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization, and communicating with a UE over the non-anchor carrier based on the second narrowband reference signal.

An apparatus for wireless communications at a base station is described. The apparatus may include a processor, memory coupled with the processor, and instructions stored in the memory. The instructions may be executable by the processor to cause the apparatus to identify a first narrowband reference signal associated with an anchor carrier, where a scrambling of the first narrowband reference signal is based on a first scrambling initialization, transmit a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization, and communicate with a UE over the non-anchor carrier based on the second narrowband reference signal.

Another apparatus for wireless communications at a base station is described. The apparatus may include means for identifying a first narrowband reference signal associated with an anchor carrier, where a scrambling of the first narrowband reference signal is based on a first scrambling initialization, transmitting a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization, and communicating with a UE over the non-anchor carrier based on the second narrowband reference signal.

A non-transitory computer-readable medium storing code for wireless communications at a base station is described. The code may include instructions executable by a processor to identify a first narrowband reference signal associated with an anchor carrier, where a scrambling of the first narrowband reference signal is based on a first scrambling initialization, transmit a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization, and communicate with a UE over the non-anchor carrier based on the second narrowband reference signal.

Some examples of the method, apparatuses, and non-transitory computer-readable medium described herein may further include operations, features, means, or instructions for receiving a capability message indicating a capability to support the scrambling of the second narrowband reference signal based on the second scrambling initialization, where transmitting the carrier configuration for the non-anchor carrier may be based on the capability message.

Some examples of the method, apparatuses, and non-transitory computer-readable medium described herein may further include operations, features, means, or instructions for broadcasting an indication associated with a set of non-anchor carriers for paging, where the indication associated with the set of non-anchor carriers for paging indicates that a subset of the set of non-anchor carriers for paging may be scrambled based on the second scrambling initialization.

Some examples of the method, apparatuses, and non-transitory computer-readable medium described herein may further include operations, features, means, or instructions for broadcasting an indication associated with a set of non-anchor carriers for random access, where the indication associated with the set of non-anchor carriers for random access indicates that a subset of the set of non-anchor carriers for random access may be scrambled based on the second scrambling initialization.

Some examples of the method, apparatuses, and non-transitory computer-readable medium described herein may further include operations, features, means, or instructions for broadcasting a system information message, where the system information message indicates a scrambling initialization type for a narrowband reference signal for a carrier associated with a multicast control channel.

Some examples of the method, apparatuses, and non-transitory computer-readable medium described herein may further include operations, features, means, or instructions for transmitting an indication associated with the multicast control channel, where the indication associated with the multicast control channel indicates a scrambling initialization type for a narrowband reference signal for a non-anchor carrier associated with a multicast traffic channel.

In some examples of the method, apparatuses, and non-transitory computer-readable medium described herein, the non-anchor carrier includes an aggregation of two physical resource blocks, where the carrier configuration for the non-anchor carrier indicates the scrambling of the second narrowband reference signal by configuring the non-anchor carrier as an aggregation of two physical resource blocks.

In some examples of the method, apparatuses, and non-transitory computer-readable medium described herein, a first physical resource block of the non-anchor carrier may be associated with a narrowband reference signal having a scrambling based on the first scrambling initialization, and a second physical resource block of the non-anchor carrier may be associated with a narrowband reference signal having a scrambling based on the second scrambling initialization.

In some examples of the method, apparatuses, and non-transitory computer-readable medium described herein, a first physical resource block and a second physical resource block of the non-anchor carrier may be associated with a narrowband reference signal having a scrambling based on the second scrambling initialization.

In some examples of the method, apparatuses, and non-transitory computer-readable medium described herein, the second scrambling initialization may be initialized once per symbol and mapped to the narrowband reference signal on both physical resource blocks.

In some examples of the method, apparatuses, and non-transitory computer-readable medium described herein, the second scrambling initialization may be initialized separately for each physical resource block based on a carrier identifier and mapped separately for each physical resource block.

Some examples of the method, apparatuses, and non-transitory computer-readable medium described herein may further include operations, features, means, or instructions for transmitting the second narrowband reference signal, where a scrambling of the second narrowband reference signal may be based on the second scrambling initialization.

In some examples of the method, apparatuses, and non-transitory computer-readable medium described herein, the second scrambling initialization may be based on a system frame number.

In some examples of the method, apparatuses, and non-transitory computer-readable medium described herein, the first scrambling initialization may be associated with a first periodicity and the second scrambling initialization may be associated with a second periodicity, where the second periodicity may be greater than the first periodicity.

DETAILED DESCRIPTION

Figure 1:
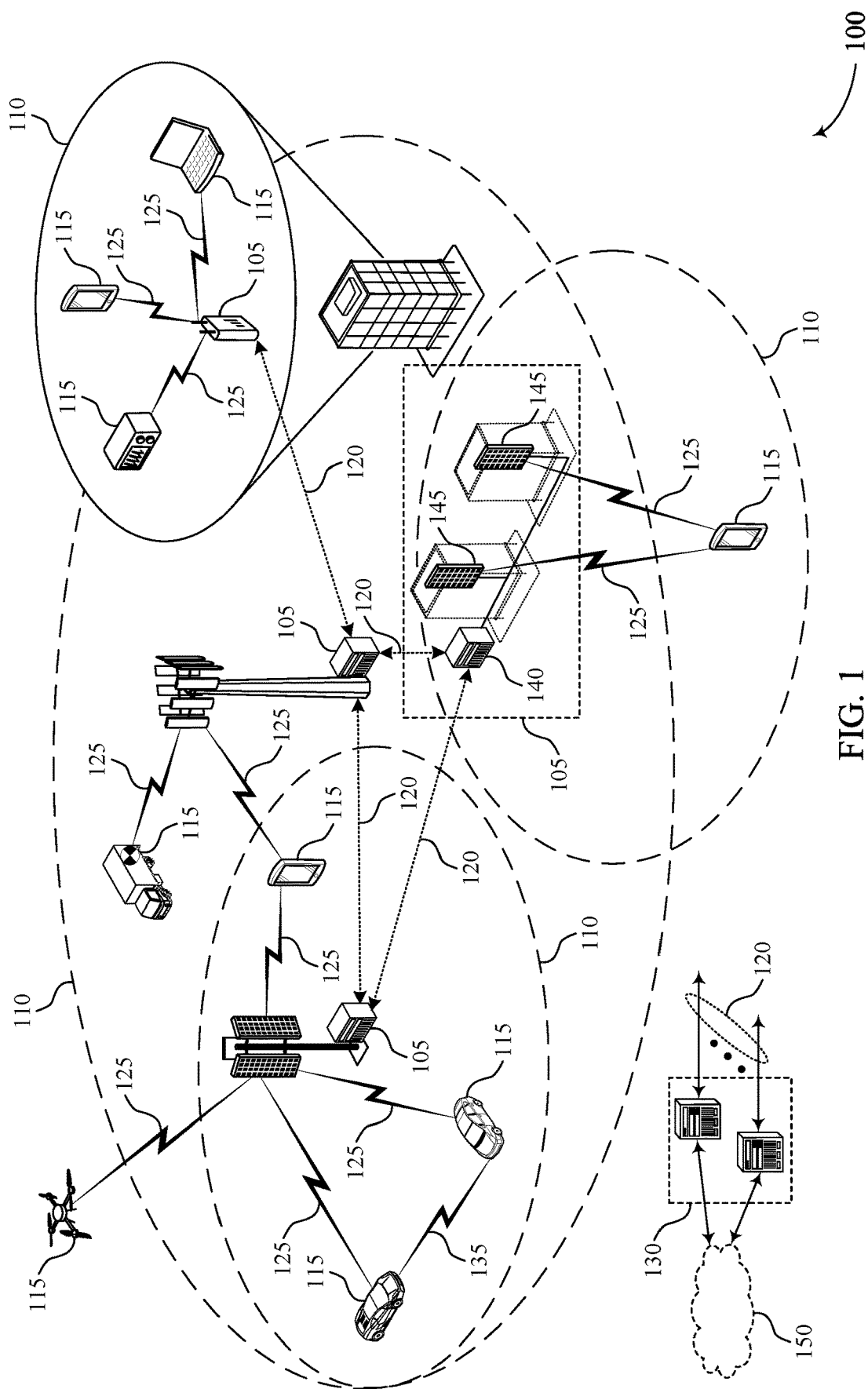
FIG. 1 illustrates an example of a system for wireless communications that supports narrowband reference signal configuration for non-anchor carriers in accordance with aspects of the present disclosure.

A base station may communicate with a user equipment (UE) (e.g., an internet of things (IOT) device) using one or more cells. IOT devices may operate on a narrowband IOT (NB-IOT) communication network to allow for connection quality among a large number of IOT devices. The base station may transmit cell specific reference signals referred to as narrowband reference signals (NRS). An NRS is a broadcast signal (e.g., all the UEs of a given base station NB-IOT carrier may listen to the same NRS) and may provide phase reference for the demodulation of downlink channels. A UE may receive a first NRS over a cell, and a second NRS over a different cell. The NRSs from the different cells may collide and cause interference for the UE, due to the number of resource elements (RE) allocated for the NRS being limited (e.g., 4-8 REs per subframe allocated for NRS). The scrambling sequence for the NRS may be initialized at the start of each orthogonal frequency-division multiplexing (OFDM) symbol and have a periodicity of 10 ms (e.g., repeat every radio frame). The first and second NRS received by the UE may correlate and the scrambling sequences may repeat at the same periodicity. In such cases, the UE may be unable to filter out the interference or noise caused by the second NRS due to the second NRS having the same periodicity as the first NRS. Thus, the interference may not be sufficiently removed by the UE at least because of the length of the NRS scrambling sequence (e.g., repeating every radio frame).

A UE may receive synchronization and system information when it connects with a base station on a carrier. The carrier for the initial connection setup between a UE and base station may be referred to as an anchor carrier and additional carriers configured by the base station may be referred to as non-anchor carriers.

In some examples, the length of the NRS scrambling sequence may be increased or extended from repeating every radio frame (e.g., 10 ms) to repeating after several radio frames. Since the NRS is a broadcast signal, changes to its sequence initialization may impact any UE that receives it. Therefore, to maintain backwards compatibility with UEs that do not support non-anchor carriers with an extended NRS scrambling technique, the network may not configure such UEs with a non-anchor carrier having the extended NRS scrambling technique, although the network may configure such UEs with a non-anchor carrier having a legacy NRS scrambling technique. In some cases, the extended NRS scrambling technique is only applied to non-anchor carriers. In such cases, UEs that do not support non-anchor carriers may not be impacted by the extended NRS scrambling technique. However, compatible UEs (e.g., UEs that do support a non-anchor carrier configuration with the adjusted NRS scrambling technique) may be assigned and benefit from the non-anchor carrier with the extended NRS scrambling sequence.

The base station may transmit, to the UE, the non-anchor carrier configuration indicating the extended scrambling sequence initialization for the NRS. The number of possible initializations may be extended by adjusting the initialization NRS scrambling sequence to be a function of the system frame number. For example, the system frame number may be included to extend the scrambling sequence initialization from a periodicity of 10 ms to 80 ms. The extended scrambling sequence may be enabled by UE capability and the network configuration. The base station may configure the UE in a non-anchor carrier (e.g., paging, random access, or single cell point to multipoint (SC-PTM) reception) configuration, indicating whether the UE is to use the legacy scrambling or the extended scrambling sequence.

Particular aspects of the subject matter described herein may be implemented to realize one or more advantages. The described techniques may support improvements in increasing the length of an NRS sequence for non-anchor carriers, decreasing signaling overhead, and improving reliability, among other advantages. As such, supported techniques may include improved network operations and, in some examples, may promote network efficiencies, among other benefits.

Aspects of the disclosure are initially described in the context of wireless communications systems that supports narrowband reference signal configuration for non-anchor carriers. Aspects of the disclosure are further illustrated by and described with reference to apparatus diagrams, system diagrams, and flowcharts that relate to narrowband reference signal configuration for non-anchor carriers.

FIG. 1 illustrates an example of a wireless communications system 100 that supports narrowband reference signal configuration for non-anchor carriers in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The length of an NRS scrambling sequence for non-anchor carriers may be increased (e.g., from one radio frame to several radio frames). For example, the NRS scrambling sequence initialization equation may be a function of system frame number. The base station may transmit to the UE a non-anchor carrier configuration indicating that the NRS scrambling sequence is extended with respect to other NRS scrambling sequences (e.g., the NRS scrambling sequence associated with an anchor carrier). For example, the non-anchor carrier configuration may indicate the scrambling sequence initialization for the NRS. In some examples, the length of the NRS scrambling sequence is increased by extending the number of possible initializations. The base station and UE may communicate based on the extended length of the NRS scrambling sequence for non-anchor carriers of the NRS.

Figure 2:
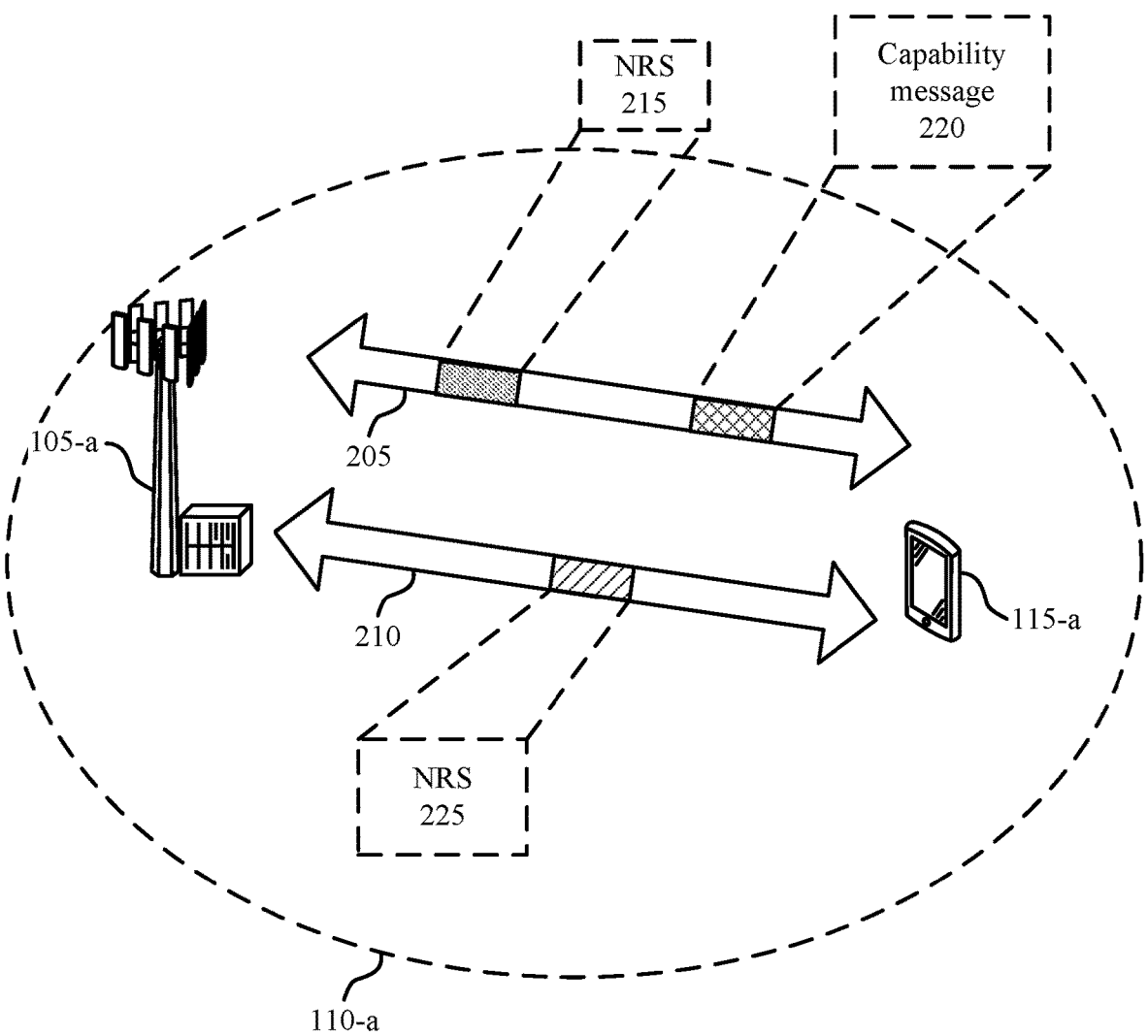
FIG. 2 illustrates an example of a wireless communications system that supports narrowband reference signal configuration for non-anchor carriers in accordance with aspects of the present disclosure.

FIG. 2 illustrates an example of a wireless communications system 200 that supports narrowband reference signal configuration for non-anchor carriers in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115, respectively, as described herein with reference to FIG. 1. In some cases, UE 115-a and base station 105-a may communicate on resources of a communication link 205 (e.g., anchor or non-anchor carrier, a channel, a beam, a physical random access channel (PRACH) etc.) and a communication link 210 (e.g., non-anchor carrier).

Base station 105-a may provide network coverage for geographic area 110-a. UE 115-a may identify a first NRS over a cell, and a second NRS over a different cell (not shown). The NRSs from the different cells may collide and cause interference for UE 115-a, due to the number of REs allocated for the NRS being limited (e.g., 4-8 REs per subframe allocated for NRS). In some systems, the scrambling sequence for the NRS may be initialized at the start of each OFDM symbol and have a periodicity of 10 ms (e.g., length of one radio frame). For example, the initialization of the NRS scrambling sequence may be represented by the following equation:

$$c_{init}=2^{10}(7(n'_s+1)+l+1)*(2*N_{ID}^{Ncell}+1)+2*N_{ID}^{Ncell}+N_{CP} \quad (1)$$

where $n'_s$ represents the slot index within a radio frame ranging from 0 to 19, l represents OFDM symbol number within a slot, ranging from 0 to 6 for normal cyclic prefix (NCP) and from 0 to 5 for extended CP (ECP), $N_{CP}$ represents the cyclic prefix, and $N_{ID}^{Ncell}$ represents the NB cell identifier (ID). In some cases, $N_{CP}$ is equal to 1 because only NCP is supported in NB-IOT. This NRS scrambling sequence initialization may be an example of a legacy sequence initialization, and as discussed in more detail herein, may be contrasted with an extended or an enhanced NRS scrambling sequence initialization.

In some examples, the first and second NRS identified by UE 115-*a* may correlate and the scrambling sequences may repeat at the same periodicity. The UE 115-*a* may be unable to filter out the interference or noise caused by the second NRS due to the second NRS having the same periodicity as the first NRS and being correlated to the first NRS. UE 115-*a* may attempt to filter out the interference but since the scrambling sequence is reinitialized every radio frame (e.g., 10 ms), UE 115-*a* may experience the same interference repeatedly. Thus, the interference causes performance degradation and may not be completely removed due to the length of the NRS scrambling sequences being one radio frame.

In some examples, the interference may be removed or reduced by extending the length of the NRS scrambling sequence from one radio to several radio frames. In this way, initialization of the NRS scrambling sequence may occur at an extended periodicity of several radio frames rather than every radio frame (e.g., as compared with the sequence initialization described with reference to equation 1). The length of the NRS scrambling sequence may be extended by adjusting the NRS scrambling sequence initialization to be a function of the system frame number. An example of an NRS scrambling sequence initialization as a function of system frame number is represented by the following equation:

$$c_{init} = 2^{10}(147(n'_f+1)+7(n'_s+1)+l+1)(2N_{ID}^{Ncell}+1) + 2N_{ID}^{Ncell} + N_{CP} \quad (2)$$

where $n'_f$ represents the system frame number modified by a factor. For example, to modify the scrambling sequence length by a factor of 8 (e.g., $n'_f = n_f \bmod 8$), using the three least significant bits (LBSs) of the radio frame number, the interference will be rejected by 6 dB more than an unmodified equation for the scrambling sequence initialization (e.g., equation 1).

In some cases, equation 2 may be modified by removing or reducing unneeded parameters (e.g., in some NB-IOT cases). Reducing unneeded paraments may extend the number of LSBs available for indicating the system frame number. For example, the NCP bit may be removed from equation 1 and may instead be used to extend the number of LSBs for system frame number because some systems (e.g., NB-IOT) may only support NCP. Furthermore, the symbol number for the NRS carrier may be statically configured for certain slots (e.g., slots {5,6}), thus 1 bit may be used instead of 3 to encode the slot location of the NRS. As such, 5 LSBs of the system frame number may be used, as represented in the following equation:

$$c_{init} = 2^9(41(n'_f+1)+2(n'_s+1)+l-5)(N_{ID}^{Ncell}+1)+N_{ID}^{Ncell} \quad (3)$$

In some examples, the NRS scrambling technique for some UEs (e.g., legacy UEs) may not be adjustable while being backwards compatible. Therefore, to maintain backwards compatibility with UEs that do not support non-anchor carriers with an extended NRS scrambling technique, the network may not configure such UEs (e.g., legacy UEs) with a non-anchor carrier having the extended NRS scrambling technique, although the network may configure such UEs with a non-anchor having a legacy NRS scrambling technique. The NRS scrambling sequence length may be adjusted (e.g., enhanced or modified as described by equations 2 and 3) on non-anchor carriers. In some cases, the extended NRS scrambling technique is only applied to non-anchor carriers. In such cases, UEs that do not support non-anchor carriers may not be impacted by the extended NRS scrambling technique. Compatible UEs (e.g., UE 115-*a*) may be assigned and benefit from the non-anchor carrier with the extended NRS scrambling sequence.

UE 115-*a* may send a capability message 220 to base station 105-*a* to indicate that UE 115-*a* is capable to support an NRS with an extended scrambling sequence initialization 230. UE 115-*a* may receive, from base station 105-*a*, a carrier configuration which indicates whether the non-anchor carrier has an NRS 225 with an extended scrambling sequence initialization 230 or an NRS 215 with a legacy scrambling sequence initialization 235. UE 115-*a* and base station 105-*a* may communicate based on NRS 215 or NRS 225.

UE 115-*a* may send the capability message 220 in paging radio carriers (e.g., stored at the mobility management entity (MME)). Base station 105-*a* may broadcast a set of paging carriers, in which a subset of the paging carriers may use the extended scrambling sequence. UE 115-*a* may receive and select a paging carrier based on UE 115-*a* capability (e.g., capability to support a legacy or extended scrambling sequence), the set of paging radio carriers, scrambling initialization type of the non-anchor carrier for paging, an ID of the UE, or a combination thereof.

Base station 105-*a* may broadcast, to UE 115-*a*, a set of non-anchor carriers for random access, in which a subset of the carriers may use the extended scrambling sequence. UE 115-*a* may select the carrier from the set of carriers based on UE 115-*a* capability. Additionally or alternatively, base station 105-*a* may broadcast, to UE 115-*a*, a system information message (e.g., system information block (SIB)) indicating the legacy scrambling sequence initialization 235 type or extended scrambling sequence initialization 230 type for the NRS for a carrier associated with a multicast control channel (MCCH) or multicast traffic channel (MTCH). The system information message may be a SC-PTM reception.

In some examples, base station 105-*a* may support a NB-IOT with a wider bandwidth by having a wider bandwidth NB-IOT carrier (e.g., non-anchor carrier) or by aggregating multiple contiguous NB-IOT carriers. In some cases, the non-anchor carrier may have a wider bandwidth than the anchor carrier. UE 115-*a* may determine if the wider bandwidth non-anchor carrier implements the legacy or extended scrambling sequence initialization type based on the carrier bandwidth or carrier configuration.

In other cases, the non-anchor carrier includes an aggregation of multiple contiguous NB-IOT carriers (e.g., two physical resource blocks (PRB)). UE 115-*a* may be configured with a carrier with two PRBs which may indicate to UE 115-*a* to implement the extended NRS scrambling sequence. In some cases, one PRB follows the legacy scrambling sequence initialization 235 (e.g., for legacy UEs) and the other PRB follows the extended scrambling sequence initialization 230.

In other cases, both of the PRBs follow the extended scrambling sequence initialization 230. Base station 105-*a* may generate one length four sequence with four symbols and map to four NRSs across two PRBs. For example, the extended scrambling sequence may be initialized once per symbol of the four symbols and mapped to the four NRSs across the two PRBs.

Additionally or alternatively, base station 105-*a* may generate two length two sequences (resulting in a total of 4 symbols), and the extended scrambling sequence may be initialized separately for each PRB. For example, the extended scrambling sequence may be initialized and mapped to the first PRB with two symbols. The extended scrambling sequence may be initialized again and mapped to the second PRB with the remaining two symbols. The extended scrambling sequence may be initialized separately for each PRB based on the carrier ID (e.g., {0,1} for the two PRBs) and mapped separately for each PRB. For example, when the carrier ID is {0}, the scrambling sequence may be initialized for the first PRB and when the carrier ID is {1}, the scrambling sequence may be initialized for the second PRB. The initialization of the NRS scrambling sequence with the carrier ID may be represented by the following equation:

$$c_{init}=2^{10}(147(n'_f+1)+7(n_s+1)+l+1)(2N_{ID}^{Ncell}+1)+2N_{ID}^{Ncell}+ID_{carrier} \quad (4)$$

Figure 3:
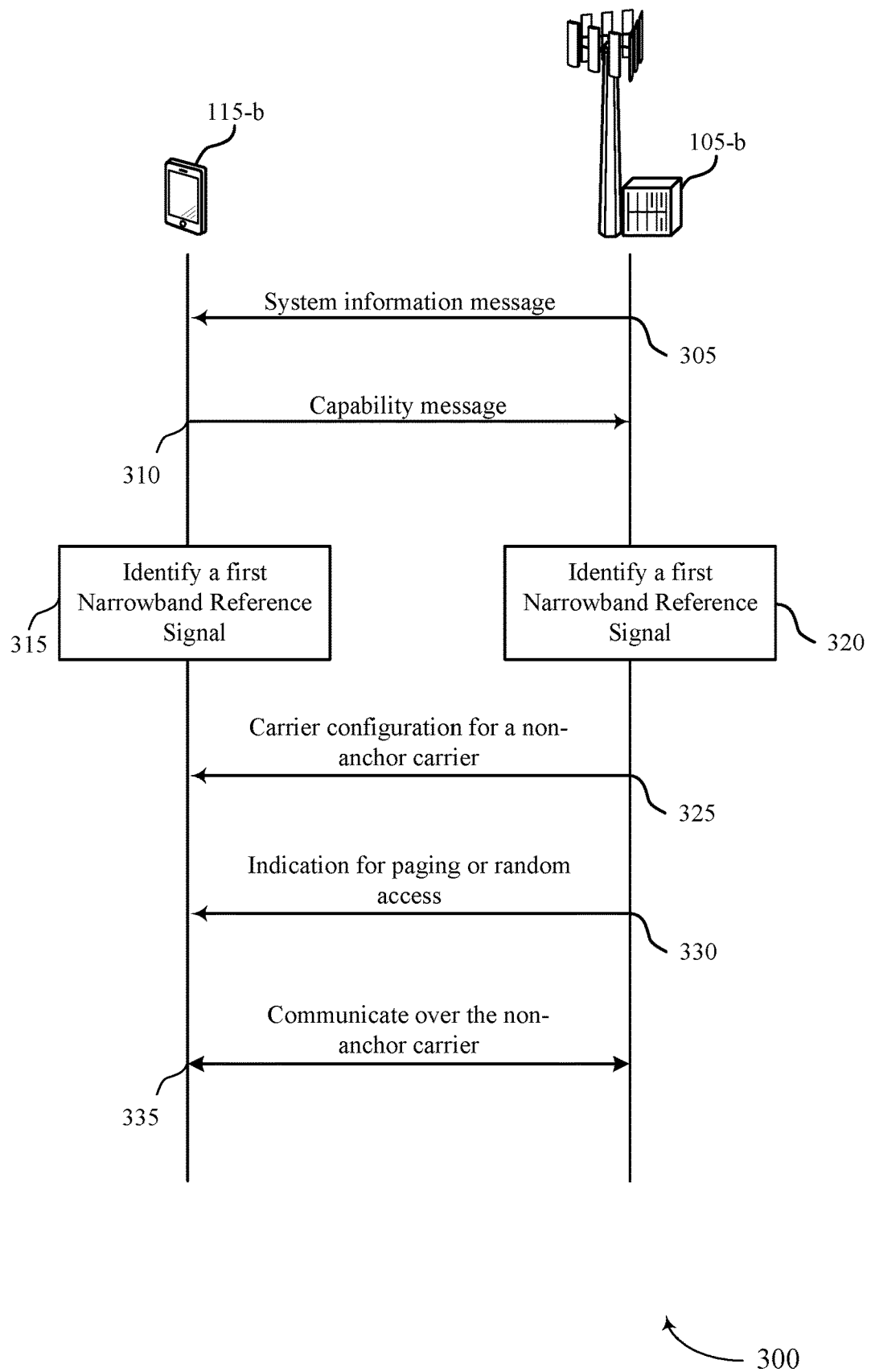
FIG. 3 illustrates an example of a process flow that supports narrowband reference signal configuration for non-anchor carriers in accordance with aspects of the present disclosure.

FIG. 3 illustrates an example of a process flow 300 that supports narrowband reference signal configuration for non-anchor carriers in accordance with aspects of the present disclosure. In some examples, process flow 300 may implement aspects of wireless communication system 100.

In some examples, process flow 300 may implement aspects of wireless communications systems 100 and 200. For instance, process flow 300 includes UE 115-b and base station 105-b, which may each be examples of the corresponding devices described with reference to FIGS. 1 and 2. Process flow 300 may illustrate the receiving of a carrier configuration for a non-anchor carrier and communicating over the non-anchor carrier.

At 305, UE 115-b may receive, from base station 115-b, a system information message (e.g., a SIB, MIB, or some combination of system information message). In some cases, the system information message indicates a scrambling initialization type for an NRS for a carrier associated with a multicast control channel. Additionally or alternatively, UE 115-b may receive, from base station 105-b, an indication associated with the multicast control channel, which indicates a scrambling initialization type for an NRS for a non-anchor carrier associated with a multicast traffic channel.

At 310, UE 115-b may transmit, to base station 105-b, a capability message indicating a capability to support the scrambling of a second NRS based on a second scrambling initialization. As described with reference to FIG. 2, the second scrambling initialization may be an example of an extended or enhanced scrambling initialization. In some cases, UE 115-a may receive a carrier configuration for the non-anchor carrier based on the capability message.

At 315, UE 115-b may identify a first NRS associated with an anchor carrier, where a scrambling of the first NRS is based on a first scrambling initialization (e.g., legacy scrambling sequence initialization). At 320, base station 105-b may identify the first NRS associated with the anchor carrier, where the scrambling of the first NRS is based on the first scrambling initialization.

At 325, UE 115-b may receive, from base station 105-b, a carrier configuration for a non-anchor carrier associated with a second NRS, where the carrier configuration for the non-anchor carrier indicates whether a scrambling of the second NRS is based on the first scrambling initialization or a second scrambling initialization (e.g., extended scrambling sequence initialization) that is different than the first scrambling initialization. The second scrambling initialization may be based on a system frame number and associated with a periodicity which is greater than the periodicity associated with the first scrambling initialization. In some examples, UE 115-b may receive, from base station 105-b, the second NRS, where the scrambling of the second NRS is based on the second scrambling initialization.

In some examples, the non-anchor carrier may include an aggregation of two physical resource blocks, where the carrier configuration for the non-anchor carrier indicates the scrambling of the second NRS by configuring the non-anchor carrier as an aggregation of the two physical resource blocks. The two physical resource blocks may include a first physical resource block and a second physical resource block of the non-anchor carrier. The first physical resource block may be associated with an NRS having a scrambling based on the first scrambling initialization and the second physical resource block of the non-anchor carrier may be associated with an NRS having a scrambling based on the second scrambling initialization. In some examples, the first physical resource block and the second physical resource block of the non-anchor carrier may be associated with an NRS having a scrambling based on the second scrambling initialization.

In some cases, the second scrambling initialization may be initialized once per symbol and mapped to the NRS on both physical resource blocks. In other cases, the second scrambling initialization may be initialized separately for each physical resource block based on a carrier ID and mapped separately for each physical resource block.

At 330, UE 115-b may receive, from base station 105-b, an indication associated with a set of non-anchor carriers for paging or random access, where the indication associated with the set of non-anchor carriers for paging or random access indicates that a subset of the set of non-anchor carriers for paging or random access is scrambled based on the second scrambling initialization. UE 115-b may select a non-anchor carrier for paging from the set of non-anchor carriers for paging based on a UE capability, a scrambling initialization type of the non-anchor carrier for paging, an ID of the UE 115-b, or a combination thereof. UE 115-b may select a non-anchor carrier for random access from the set of non-anchor carriers for random access based on a UE capability.

At 335, UE 115-b may communicate with base station 105-b over the non-anchor carrier based on the second NRS.

Figure 4:
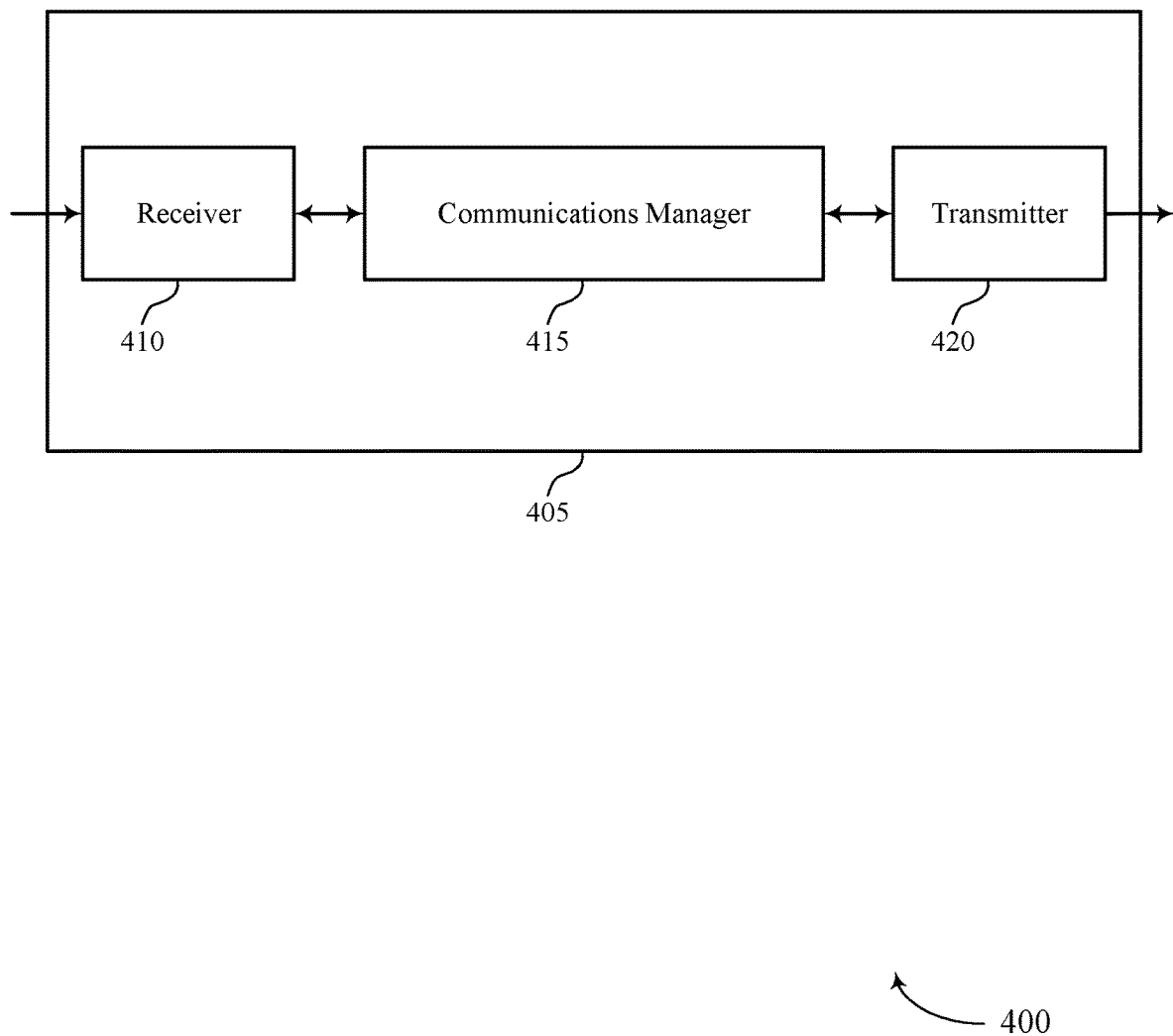
FIGS. 4 and 5 show diagrams of devices that support narrowband reference signal configuration for non-anchor carriers in accordance with aspects of the present disclosure.

FIG. 4 shows a diagram 400 of a device 405 that supports narrowband reference signal configuration for non-anchor carriers in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to narrowband reference signal configuration for non-anchor carriers, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify a first narrowband reference signal associated with an anchor carrier, where a scrambling of the first narrowband reference signal is based on a first scrambling initialization, receive a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization, and communicate with a base station over the non-anchor carrier based on the second narrowband reference signal. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device 405 to receive a carrier configuration, indicating an extended scrambling sequence initialization, for a non-anchor carrier associated with an NRS and communicate with a base station over the non-anchor carrier. The increased length of the scrambling sequence for an NRS may increase reliability and reduce latency during feedback transmissions.

Based on techniques for increasing the length of an NRS scrambling sequence as described herein, a processor of a UE 115 (e.g., controlling the receiver 410, the transmitter 420, or the transceiver 720 as described with reference to FIG. 7) may increase reliability and decrease signaling overhead in the communications between UE 115 and base station 105 because multiple NRSs may not collide.

Figure 5:
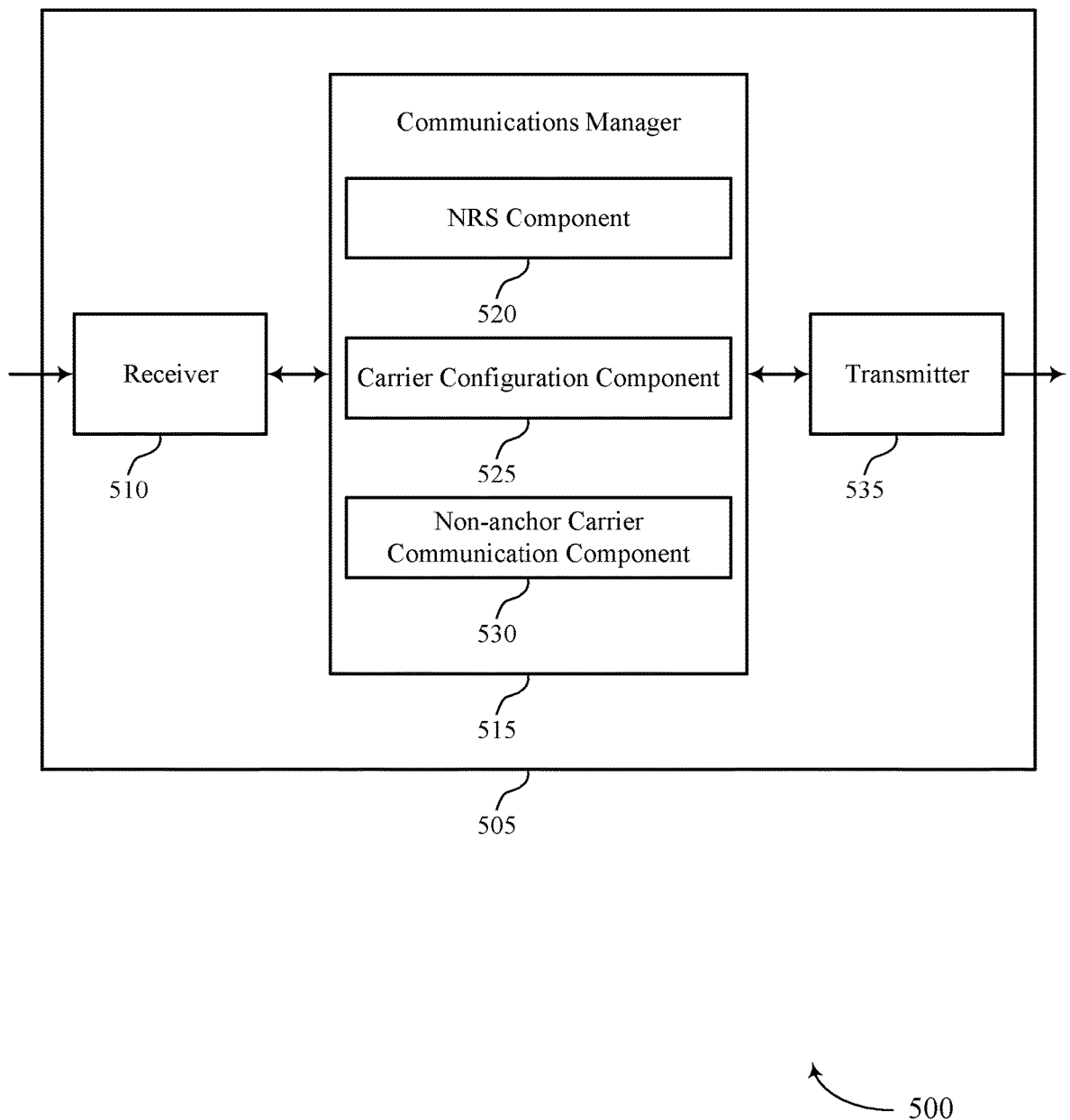

FIG. 5 shows a diagram 500 of a device 505 that supports narrowband reference signal configuration for non-anchor carriers in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to narrowband reference signal configuration for non-anchor carriers, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include an NRS component 520, a carrier configuration component 525, and a non-anchor carrier communication component 530. The communications manager 515 may be an example of aspects of the communications manager 710 described herein.

The NRS component 520 may identify a first narrowband reference signal associated with an anchor carrier, where a scrambling of the first narrowband reference signal is based on a first scrambling initialization.

The carrier configuration component 525 may receive a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization.

The non-anchor carrier communication component 530 may communicate with a base station over the non-anchor carrier based on the second narrowband reference signal.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

In some examples, the communications manager 515 may be implemented as an integrated circuit or chipset for a mobile device modem, and the receiver 510 and transmitter 535 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to receive a carrier configuration, indicating an extended scrambling sequence initialization, for a non-anchor carrier associated with an NRS and communicate with a base station over the non-anchor carrier. The increased length of the scrambling sequence for an NRS may increase reliability and reduce latency during feedback transmissions.

Based on techniques for increasing the length of an NRS scrambling sequence as described herein, a processor of a UE 115 (e.g., controlling the receiver 510, the transmitter 535, or the transceiver 720 as described with reference to FIG. 7) may increase reliability and decrease signaling overhead in the communications between UE 115 and base station 105 because multiple NRSs may not collide.

Figure 6:
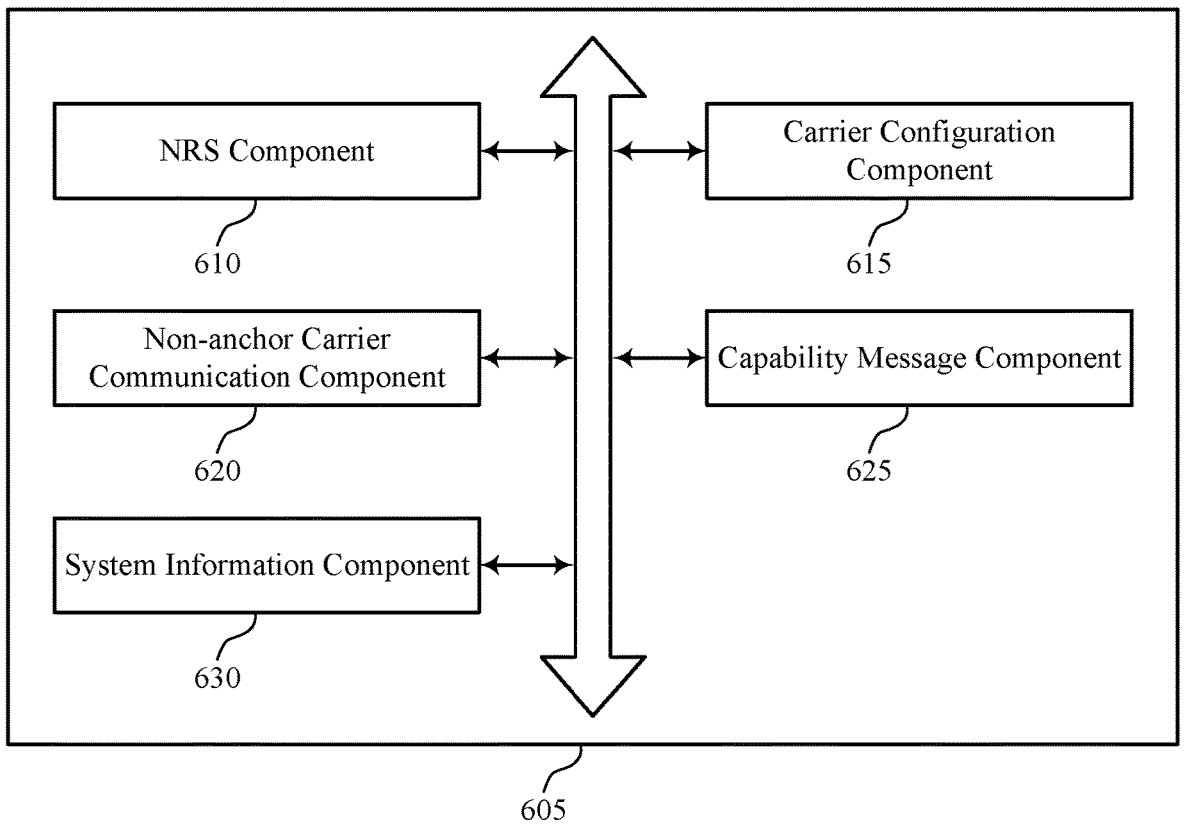
FIG. 6 shows a diagram of a communications manager that supports narrowband reference signal configuration for non-anchor carriers in accordance with aspects of the present disclosure.

FIG. 6 shows a diagram 600 of a communications manager 605 that supports narrowband reference signal configuration for non-anchor carriers in accordance with aspects of the present disclosure. The communications manager 605 may be an example of aspects of a communications manager 415, a communications manager 515, or a communications manager 710 described herein. The communications manager 605 may include an NRS component 610, a carrier configuration component 615, a non-anchor carrier communication component 620, a capability message component 625, and a system information component 630. Each of these modules may communicate, directly or indirectly, with one another (e.g., via one or more buses).

The NRS component 610 may identify a first narrowband reference signal associated with an anchor carrier, where a scrambling of the first narrowband reference signal is based on a first scrambling initialization.

The carrier configuration component 615 may receive a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization.

In some examples, the carrier configuration component 615 may receive an indication associated with a set of non-anchor carriers for paging, where the indication associated with the set of non-anchor carriers for paging indicates that a subset of the set of non-anchor carriers for paging is scrambled based on the second scrambling initialization. In some cases, the carrier configuration component 615 may select a non-anchor carrier for paging from the set of non-anchor carriers for paging based on a UE capability, a scrambling initialization type of the non-anchor carrier for paging, an identifier of the UE, or a combination thereof.

In some examples, the carrier configuration component 615 may receive an indication associated with a set of non-anchor carriers for random access, where the indication associated with the set of non-anchor carriers for random access indicates that a subset of the set of non-anchor carriers for random access is scrambled based on the second scrambling initialization. In some cases, the carrier configuration component 615 may select a non-anchor carrier for random access from the set of non-anchor carriers for random access based on a UE capability.

In some examples, the carrier configuration component 615 may receive the second narrowband reference signal, where a scrambling of the second narrowband reference signal is based on the second scrambling initialization.

In some cases, the non-anchor carrier includes an aggregation of two physical resource blocks, where the carrier configuration for the non-anchor carrier indicates the scrambling of the second narrowband reference signal by configuring the non-anchor carrier as an aggregation of two physical resource blocks. In some examples, a first physical resource block of the non-anchor carrier is associated with a narrowband reference signal having a scrambling based on the first scrambling initialization. In some examples, a second physical resource block of the non-anchor carrier is associated with a narrowband reference signal having a scrambling based on the second scrambling initialization.

In some cases, a first physical resource block and a second physical resource block of the non-anchor carrier are associated with a narrowband reference signal having a scrambling based on the second scrambling initialization.

In some cases, the second scrambling initialization is initialized once per symbol and mapped to the narrowband reference signal on both physical resource blocks. In some examples, the second scrambling initialization is initialized separately for each physical resource block based on a carrier identifier and mapped separately for each physical resource block. In some cases, the second scrambling initialization is based on a system frame number. In some examples, the first scrambling initialization is associated with a first periodicity and the second scrambling initialization is associated with a second periodicity, where the second periodicity is greater than the first periodicity.

The non-anchor carrier communication component 620 may communicate with a base station over the non-anchor carrier based on the second narrowband reference signal.

The capability message component 625 may transmit a capability message indicating a capability to support the scrambling of the second narrowband reference signal based on the second scrambling initialization, where receiving the carrier configuration for the non-anchor carrier is based on the capability message.

The system information component 630 may receive a system information message, where the system information message indicates a scrambling initialization type for a narrowband reference signal for a carrier associated with a multicast control channel.

In some examples, the system information component 630 may receive an indication associated with the multicast control channel, where the indication associated with the multicast control channel indicates a scrambling initialization type for a narrowband reference signal for a non-anchor carrier associated with a multicast traffic channel.

Figure 7:
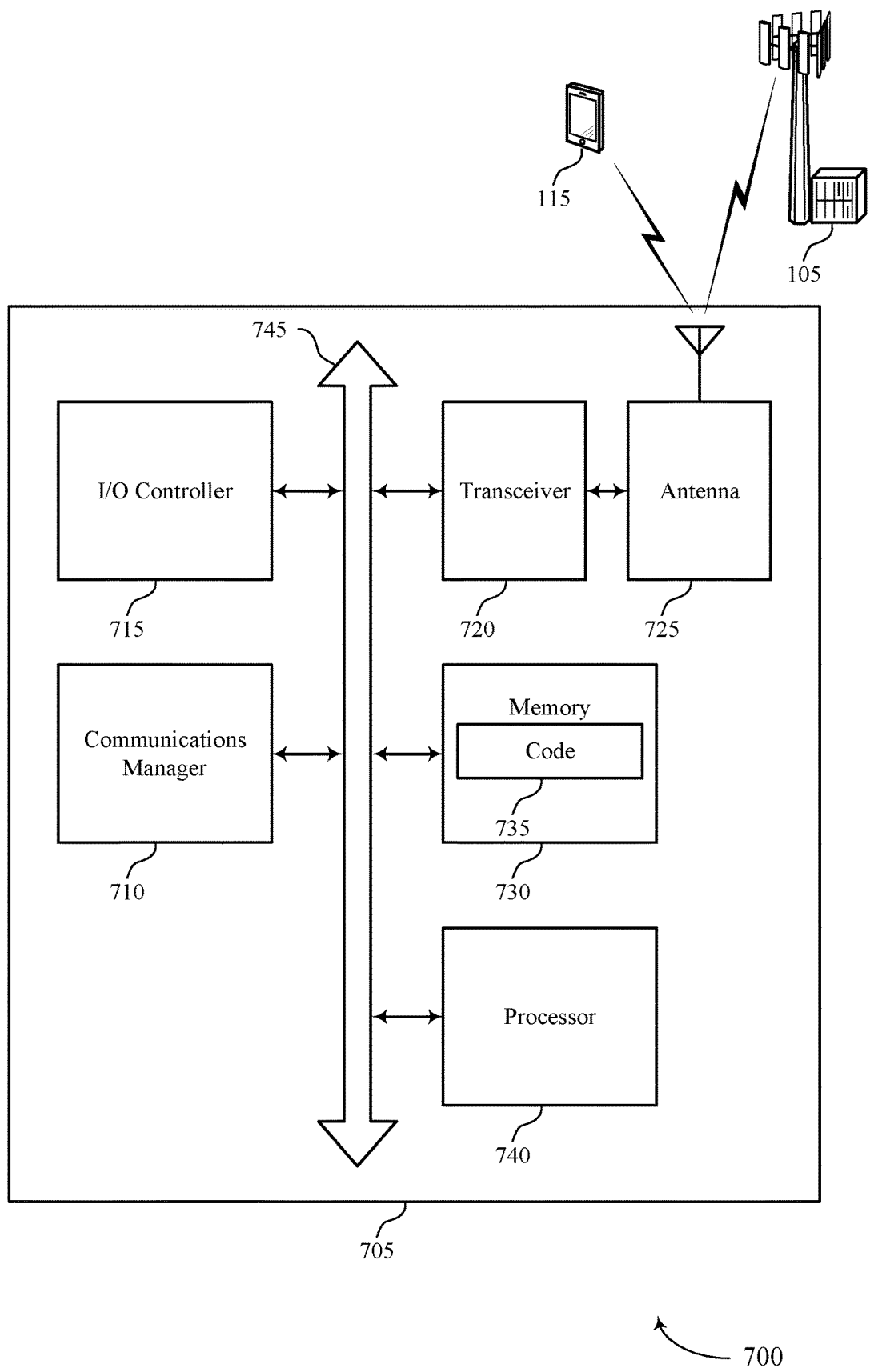
FIG. 7 shows a diagram of a system including a device that supports narrowband reference signal configuration for non-anchor carriers in accordance with aspects of the present disclosure.

FIG. 7 shows a diagram of a system 700 including a device 705 that supports narrowband reference signal configuration for non-anchor carriers in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a first narrowband reference signal associated with an anchor carrier, where a scrambling of the first narrowband reference signal is based on a first scrambling initialization, receive a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization, and communicate with a base station over the non-anchor carrier based on the second narrowband reference signal.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as IOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting narrowband reference signal configuration for non-anchor carriers).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
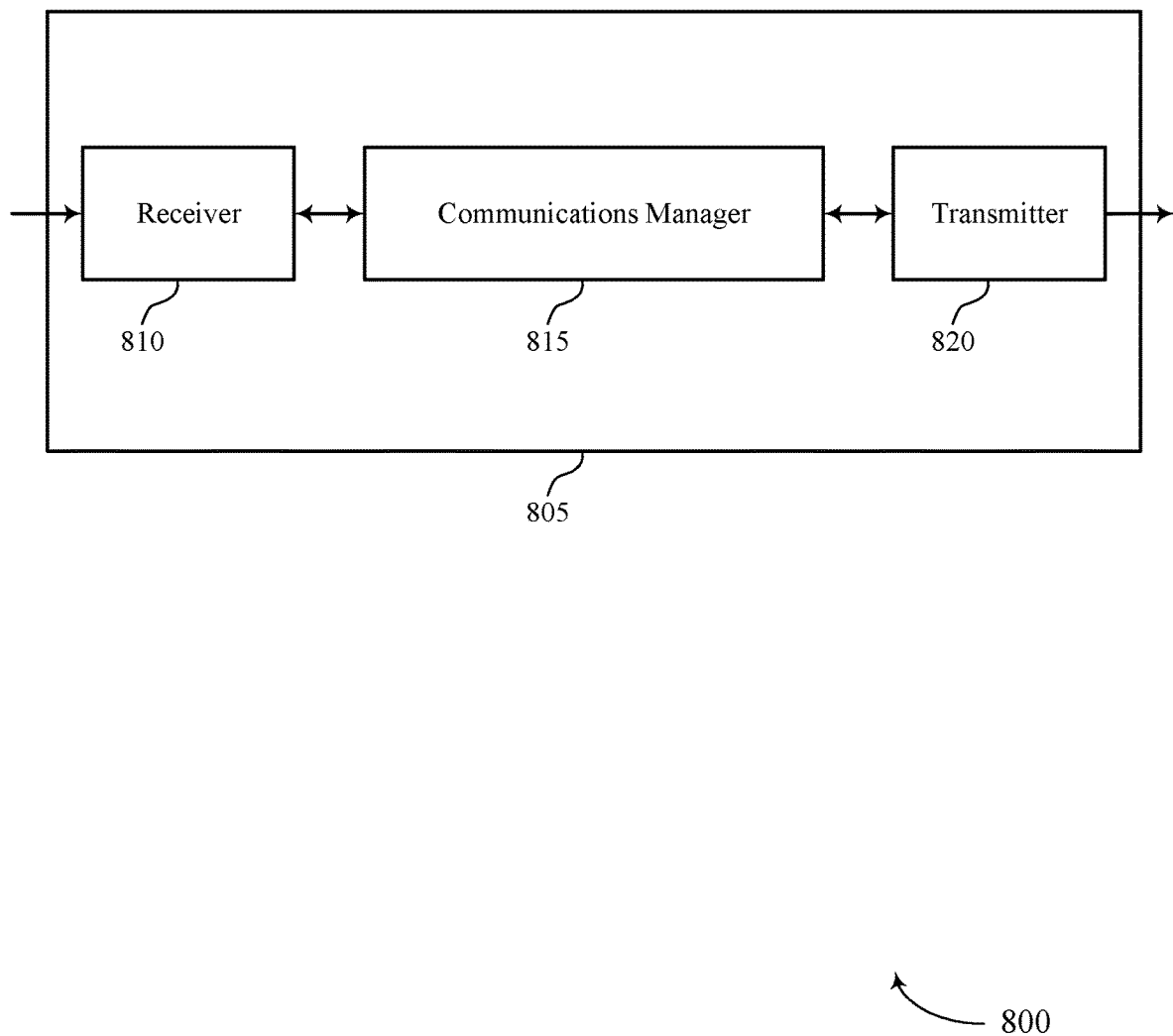
FIGS. 8 and 9 show diagrams of devices that support narrowband reference signal configuration for non-anchor carriers in accordance with aspects of the present disclosure.

FIG. 8 shows a diagram 800 of a device 805 that supports narrowband reference signal configuration for non-anchor carriers in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to narrowband reference signal configuration for non-anchor carriers, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a first narrowband reference signal associated with an anchor carrier, where a scrambling of the first narrowband reference signal is based on a first scrambling initialization, transmit a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization, and communicate with a UE over the non-anchor carrier based on the second narrowband reference signal. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
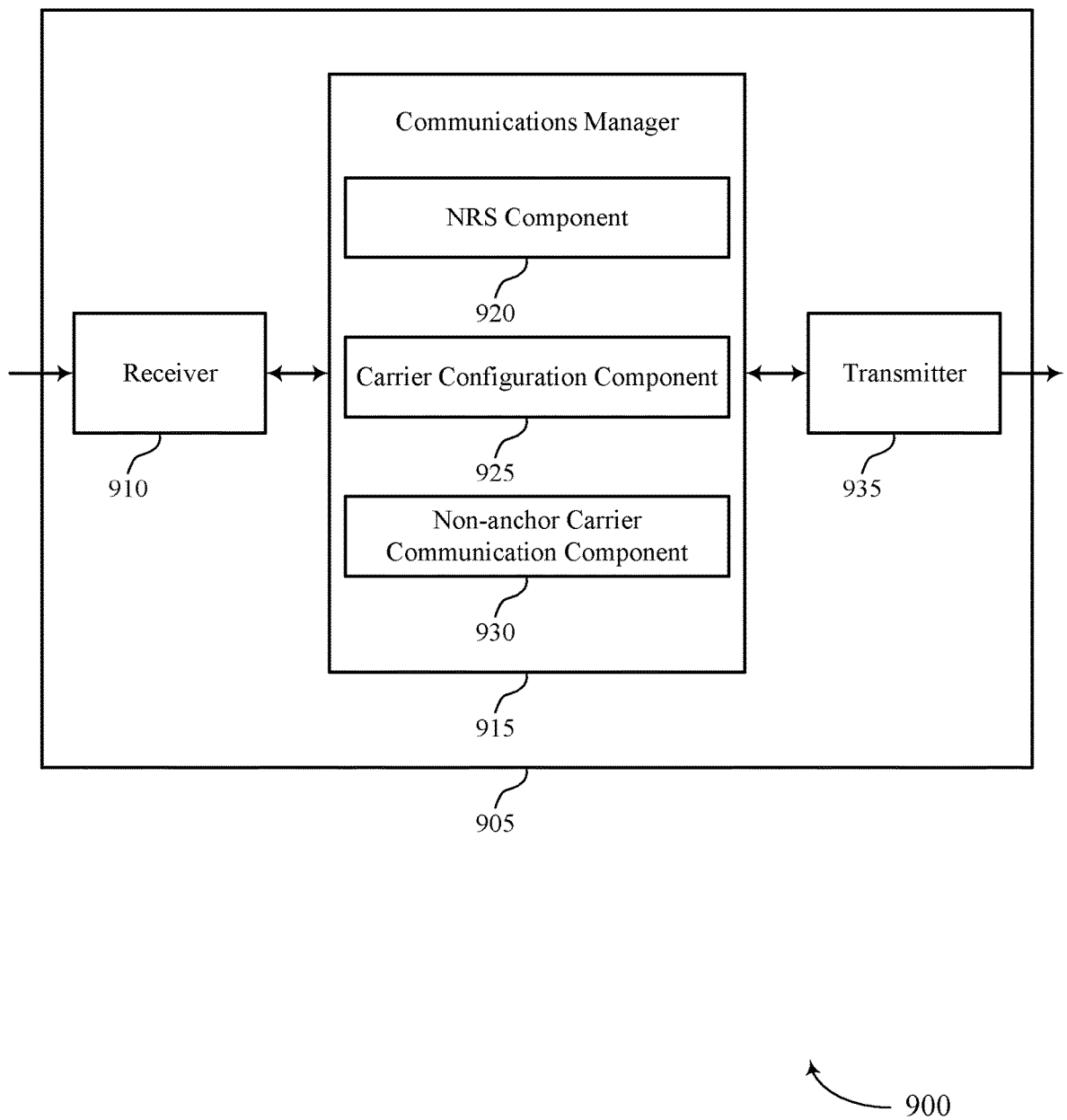

FIG. 9 shows a diagram 900 of a device 905 that supports narrowband reference signal configuration for non-anchor carriers in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to narrowband reference signal configuration for non-anchor carriers, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an NRS component 920, a carrier configuration component 925, and a non-anchor carrier communication component 930. The communications manager 915 may be an example of aspects of the communications manager 1110 described herein.

The NRS component 920 may identify a first narrowband reference signal associated with an anchor carrier, where a scrambling of the first narrowband reference signal is based on a first scrambling initialization.

The carrier configuration component 925 may transmit a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization.

The non-anchor carrier communication component 930 may communicate with a UE over the non-anchor carrier based on the second narrowband reference signal.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
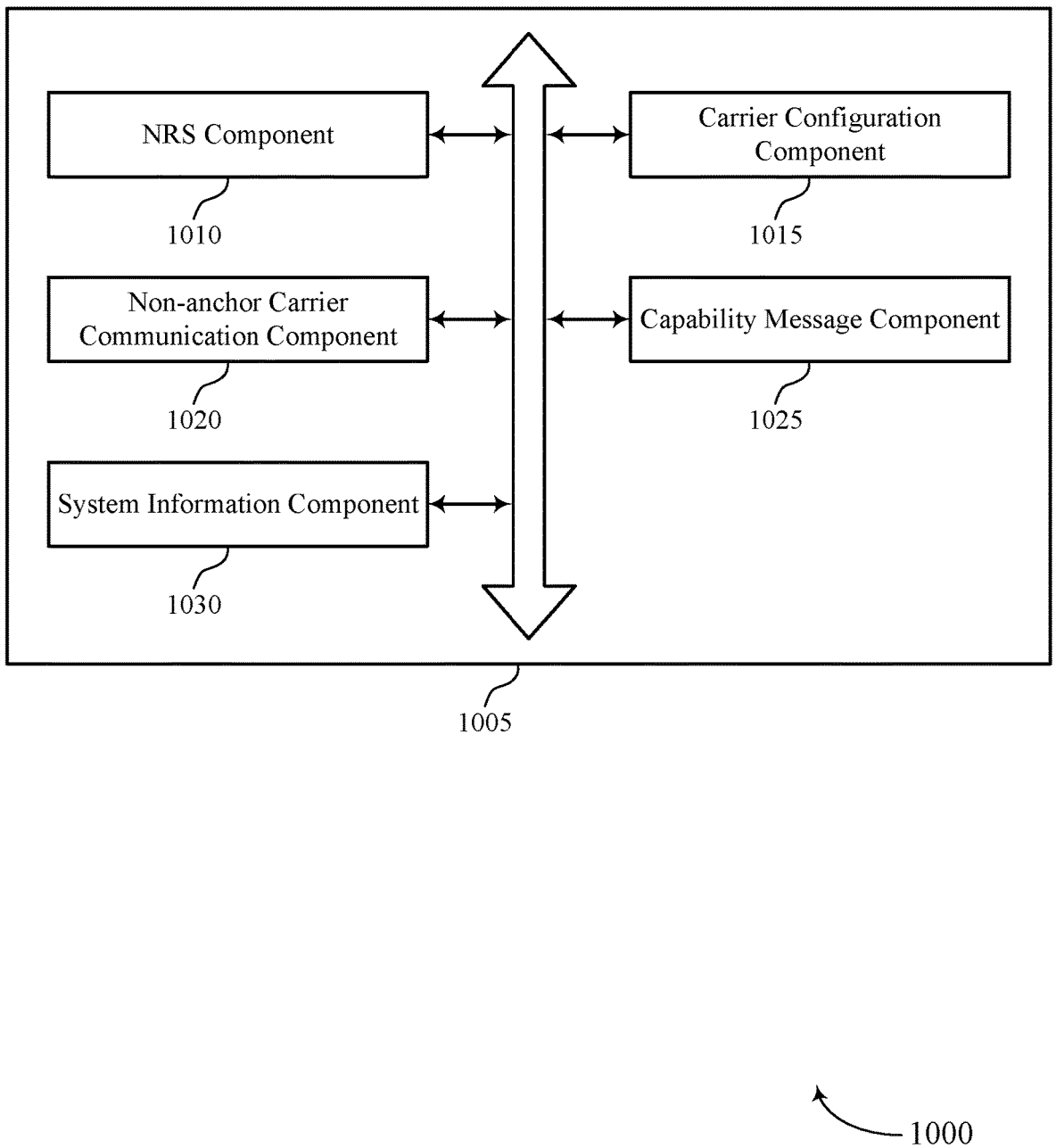
FIG. 10 shows a diagram of a communications manager that supports narrowband reference signal configuration for non-anchor carriers in accordance with aspects of the present disclosure.

FIG. 10 shows a diagram 1000 of a communications manager 1005 that supports narrowband reference signal configuration for non-anchor carriers in accordance with aspects of the present disclosure. The communications manager 1005 may be an example of aspects of a communications manager 815, a communications manager 915, or a communications manager 1110 described herein. The communications manager 1005 may include an NRS component 1010, a carrier configuration component 1015, a non-anchor carrier communication component 1020, a capability message component 1025, and a system information component 1030. Each of these modules may communicate, directly or indirectly, with one another (e.g., via one or more buses).

The NRS component 1010 may identify a first narrowband reference signal associated with an anchor carrier, where a scrambling of the first narrowband reference signal is based on a first scrambling initialization.

The carrier configuration component 1015 may transmit a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization.

In some examples, the carrier configuration component 1015 may broadcast an indication associated with a set of non-anchor carriers for paging, where the indication associated with the set of non-anchor carriers for paging indicates that a subset of the set of non-anchor carriers for paging is scrambled based on the second scrambling initialization.

In some examples, the carrier configuration component 1015 may broadcast an indication associated with a set of non-anchor carriers for random access, where the indication associated with the set of non-anchor carriers for random access indicates that a subset of the set of non-anchor carriers for random access is scrambled based on the second scrambling initialization.

In some examples, the carrier configuration component 1015 may transmit the second narrowband reference signal, where a scrambling of the second narrowband reference signal is based on the second scrambling initialization.

In some cases, the non-anchor carrier includes an aggregation of two physical resource blocks, and where the carrier configuration for the non-anchor carrier indicates the scrambling of the second narrowband reference signal by configuring the non-anchor carrier as an aggregation of two physical resource blocks. In some cases, a first physical resource block of the non-anchor carrier is associated with a narrowband reference signal having a scrambling based on the first scrambling initialization. In some cases, a second physical resource block of the non-anchor carrier is associated with a narrowband reference signal having a scrambling based on the second scrambling initialization.

In some cases, a first physical resource block and a second physical resource block of the non-anchor carrier are associated with a narrowband reference signal having a scrambling based on the second scrambling initialization.

In some cases, the second scrambling initialization is initialized once per symbol and mapped to the narrowband reference signal on both physical resource blocks. In some examples, the second scrambling initialization is initialized separately for each physical resource block based on a carrier identifier and mapped separately for each physical resource block. In some cases, the second scrambling initialization is based on a system frame number. In some cases, the first scrambling initialization is associated with a first periodicity and the second scrambling initialization is associated with a second periodicity, where the second periodicity is greater than the first periodicity.

The non-anchor carrier communication component 1020 may communicate with a UE over the non-anchor carrier based on the second narrowband reference signal.

The capability message component 1025 may receive a capability message indicating a capability to support the scrambling of the second narrowband reference signal based on the second scrambling initialization, where transmitting the carrier configuration for the non-anchor carrier is based on the capability message.

The system information component 1030 may broadcast a system information message, where the system information message indicates a scrambling initialization type for a narrowband reference signal for a carrier associated with a multicast control channel.

In some examples, the system information component 1030 may transmit an indication associated with the multicast control channel, where the indication associated with the multicast control channel indicates a scrambling initialization type for a narrowband reference signal for a non-anchor carrier associated with a multicast traffic channel.

Figure 11:
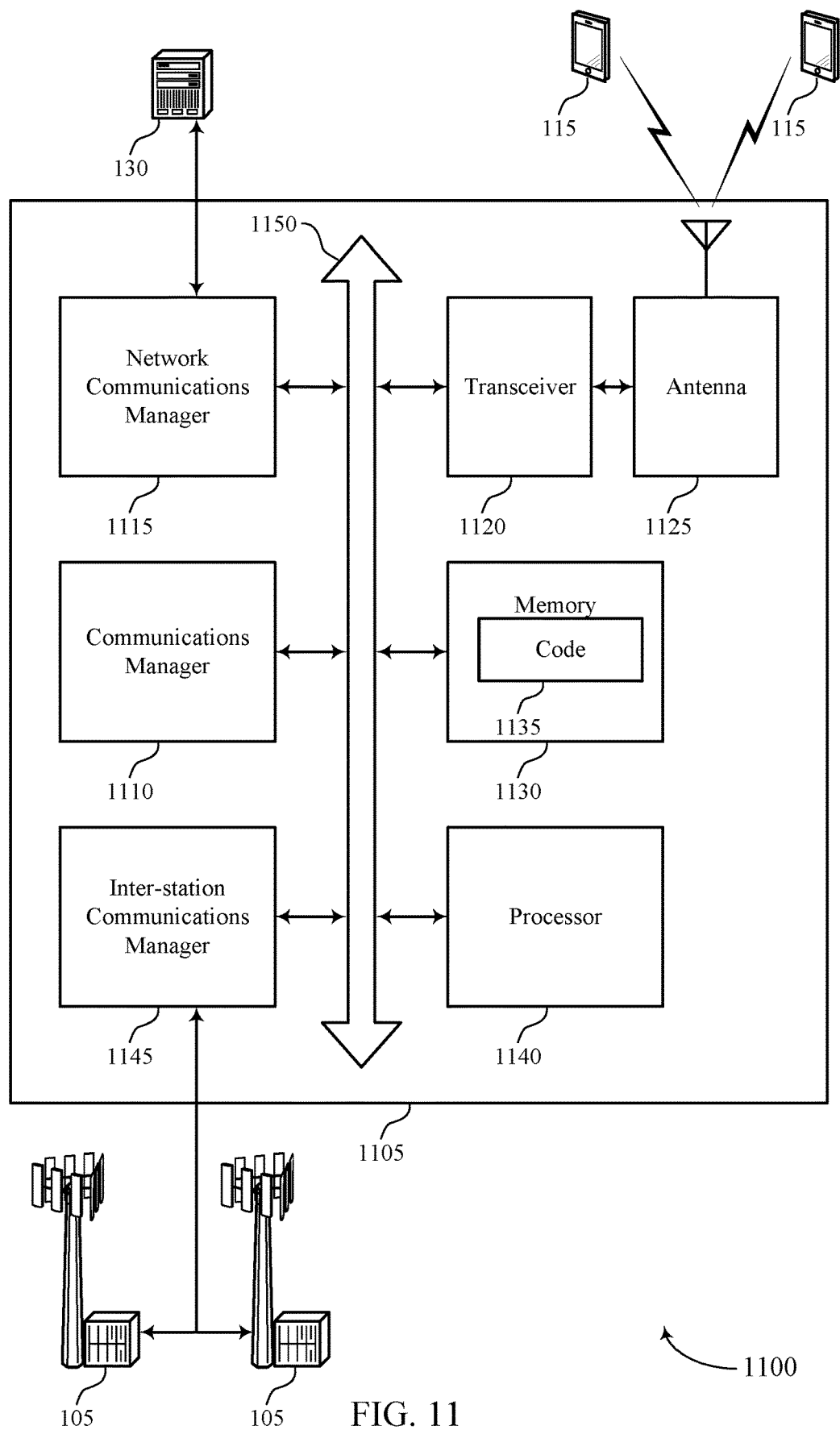
FIG. 11 shows a diagram of a system including a device that supports narrowband reference signal configuration for non-anchor carriers in accordance with aspects of the present disclosure.

FIG. 11 shows a diagram of a system 1100 including a device 1105 that supports narrowband reference signal configuration for non-anchor carriers in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify a first narrowband reference signal associated with an anchor carrier, where a scrambling of the first narrowband reference signal is based on a first scrambling initialization, transmit a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization, and communicate with a UE over the non-anchor carrier based on the second narrowband reference signal.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting narrowband reference signal configuration for non-anchor carriers).

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
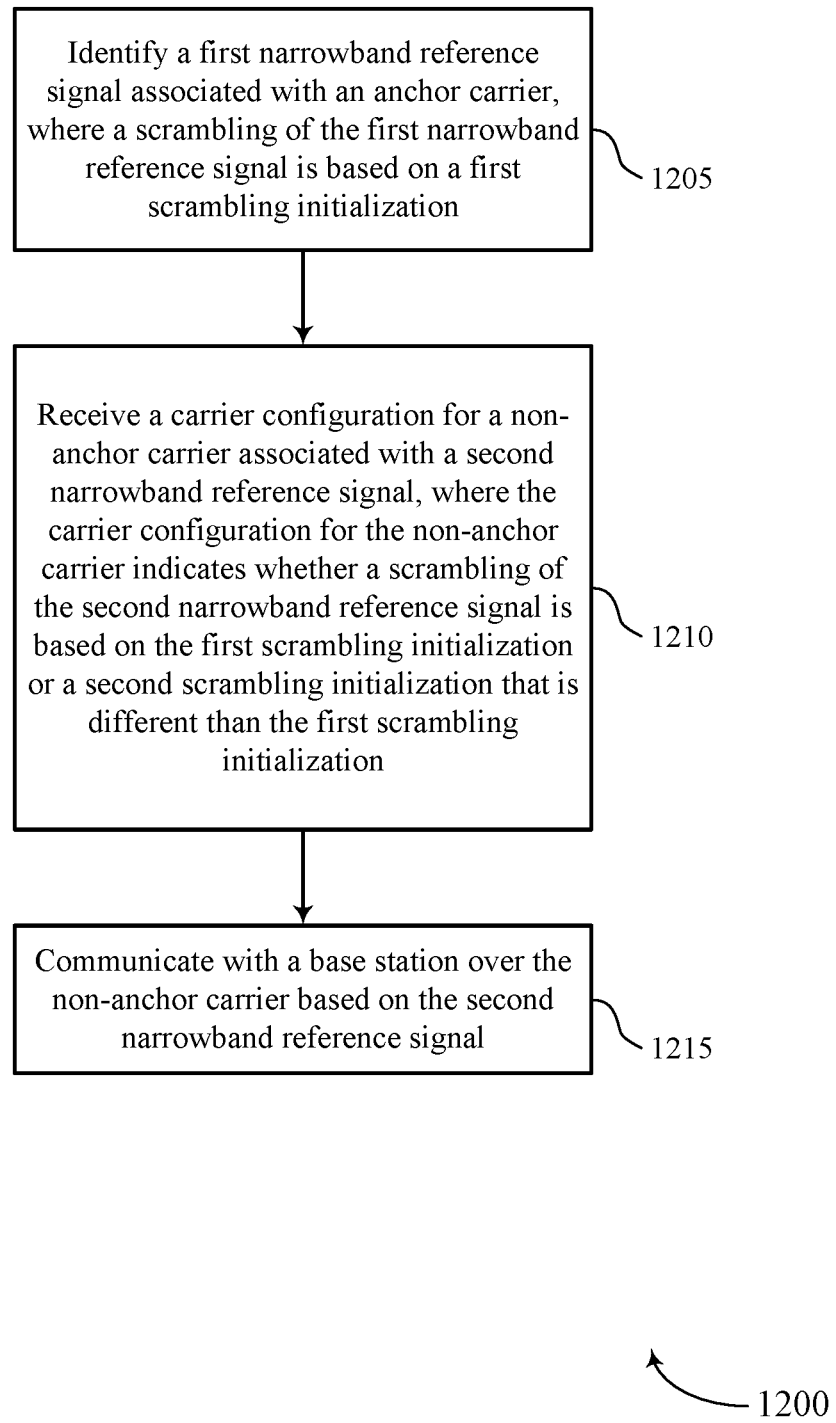
FIGS. 12 through 17 show flowcharts illustrating methods that support narrowband reference signal configuration for non-anchor carriers in accordance with aspects of the present disclosure.

FIG. 12 shows a flowchart illustrating a method 1200 that supports narrowband reference signal configuration for non-anchor carriers in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may identify a first narrowband reference signal associated with an anchor carrier, where a scrambling of the first narrowband reference signal is based on a first scrambling initialization. The operations of 1205 may be performed according to the methods described herein. In some examples, aspects of the operations of 1205 may be performed by an NRS component as described with reference to FIGS. 4 through 7.

At 1210, the UE may receive a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization. The operations of 1210 may be performed according to the methods described herein. In some examples, aspects of the operations of 1210 may be performed by a carrier configuration component as described with reference to FIGS. 4 through 7.

At 1215, the UE may communicate with a base station over the non-anchor carrier based on the second narrowband reference signal. The operations of 1215 may be performed according to the methods described herein. In some examples, aspects of the operations of 1215 may be performed by a non-anchor carrier communication component as described with reference to FIGS. 4 through 7.

Figure 13:
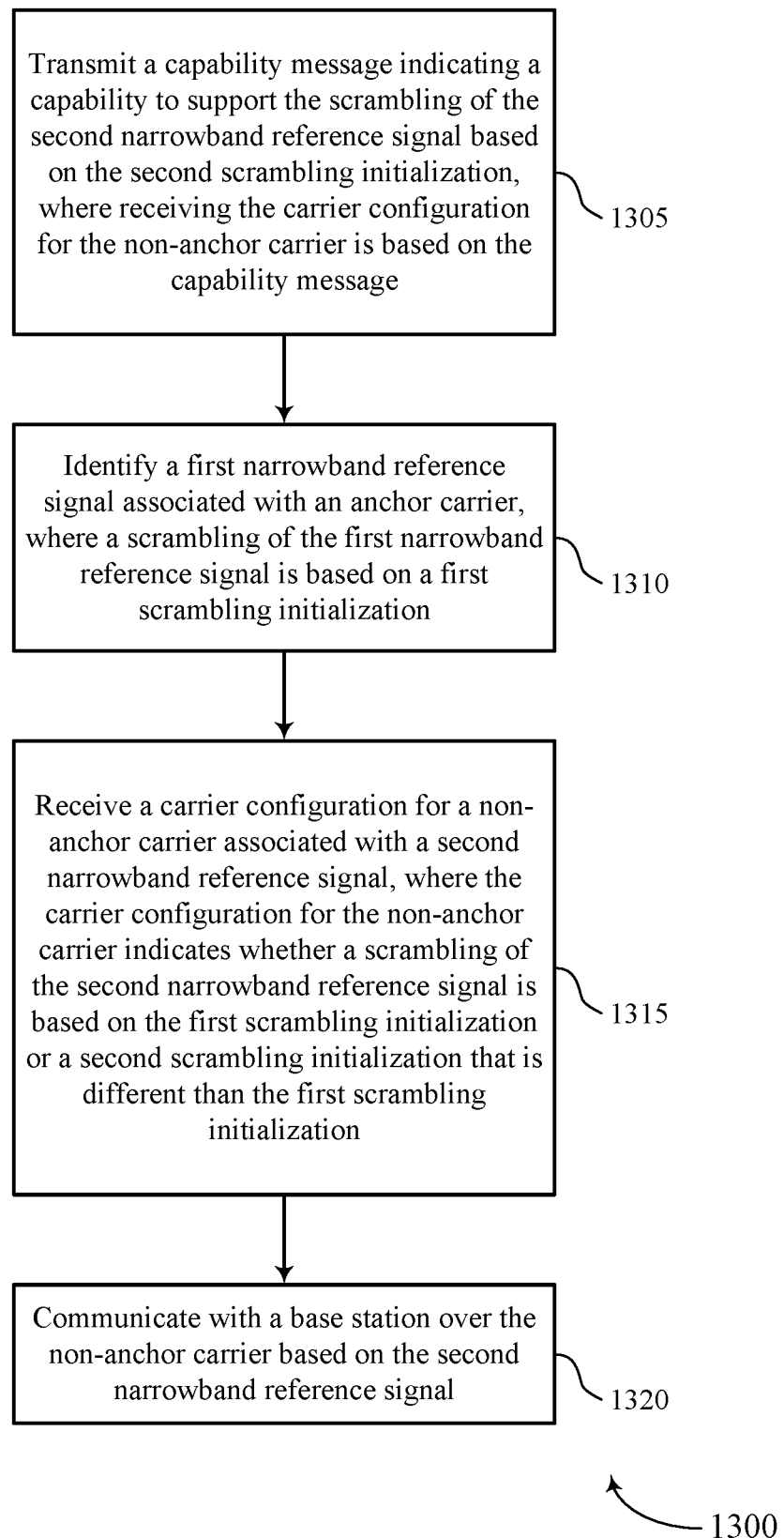

FIG. 13 shows a flowchart illustrating a method 1300 that supports narrowband reference signal configuration for non-anchor carriers in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may transmit a capability message indicating a capability to support the scrambling of the second narrowband reference signal based on the second scrambling initialization, where receiving the carrier configuration for the non-anchor carrier is based on the capability message. The operations of 1305 may be performed according to the methods described herein. In some examples, aspects of the operations of 1305 may be performed by a capability message component as described with reference to FIGS. 4 through 7.

At 1310, the UE may identify a first narrowband reference signal associated with an anchor carrier, where a scrambling of the first narrowband reference signal is based on a first scrambling initialization. The operations of 1310 may be performed according to the methods described herein. In some examples, aspects of the operations of 1310 may be performed by an NRS component as described with reference to FIGS. 4 through 7.

At 1315, the UE may receive a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization. The operations of 1315 may be performed according to the methods described herein. In some examples, aspects of the operations of 1315 may be performed by a carrier configuration component as described with reference to FIGS. 4 through 7.

At 1320, the UE may communicate with a base station over the non-anchor carrier based on the second narrowband reference signal. The operations of 1320 may be performed according to the methods described herein. In some examples, aspects of the operations of 1320 may be performed by a non-anchor carrier communication component as described with reference to FIGS. 4 through 7.

Figure 14:
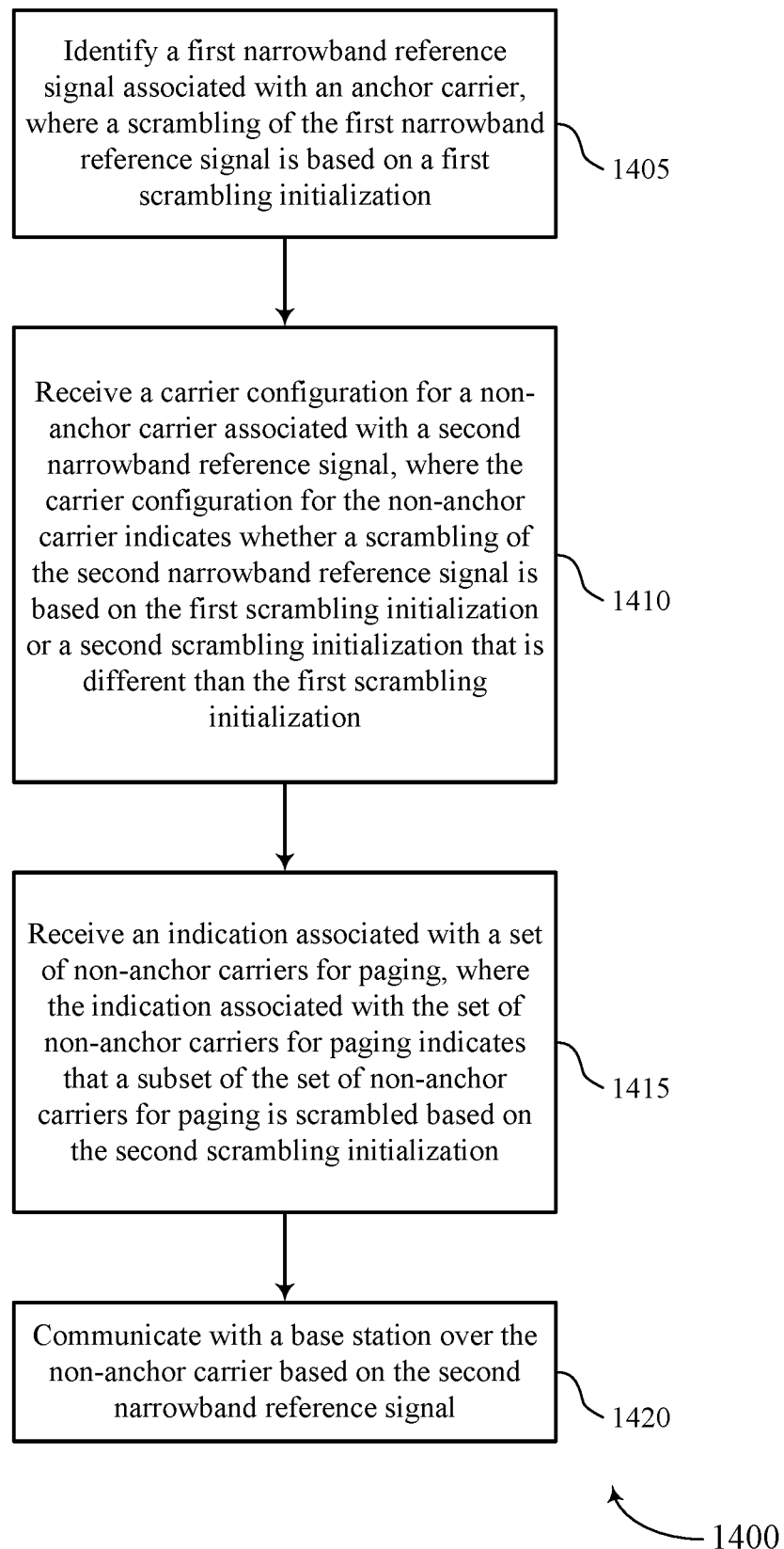

FIG. 14 shows a flowchart illustrating a method 1400 that supports narrowband reference signal configuration for non-anchor carriers in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may identify a first narrowband reference signal associated with an anchor carrier, where a scrambling of the first narrowband reference signal is based on a first scrambling initialization. The operations of 1405 may be performed according to the methods described herein. In some examples, aspects of the operations of 1405 may be performed by an NRS component as described with reference to FIGS. 4 through 7.

At 1410, the UE may receive a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization. The operations of 1410 may be performed according to the methods described herein. In some examples, aspects of the operations of 1410 may be performed by a carrier configuration component as described with reference to FIGS. 4 through 7.

At 1415, the UE may receive an indication associated with a set of non-anchor carriers for paging, where the indication associated with the set of non-anchor carriers for paging indicates that a subset of the set of non-anchor carriers for paging is scrambled based on the second scrambling initialization. The operations of 1415 may be performed according to the methods described herein. In some examples, aspects of the operations of 1415 may be performed by a carrier configuration component as described with reference to FIGS. 4 through 7.

At 1420, the UE may communicate with a base station over the non-anchor carrier based on the second narrowband reference signal. The operations of 1420 may be performed according to the methods described herein. In some examples, aspects of the operations of 1420 may be performed by a non-anchor carrier communication component as described with reference to FIGS. 4 through 7.

Figure 15:
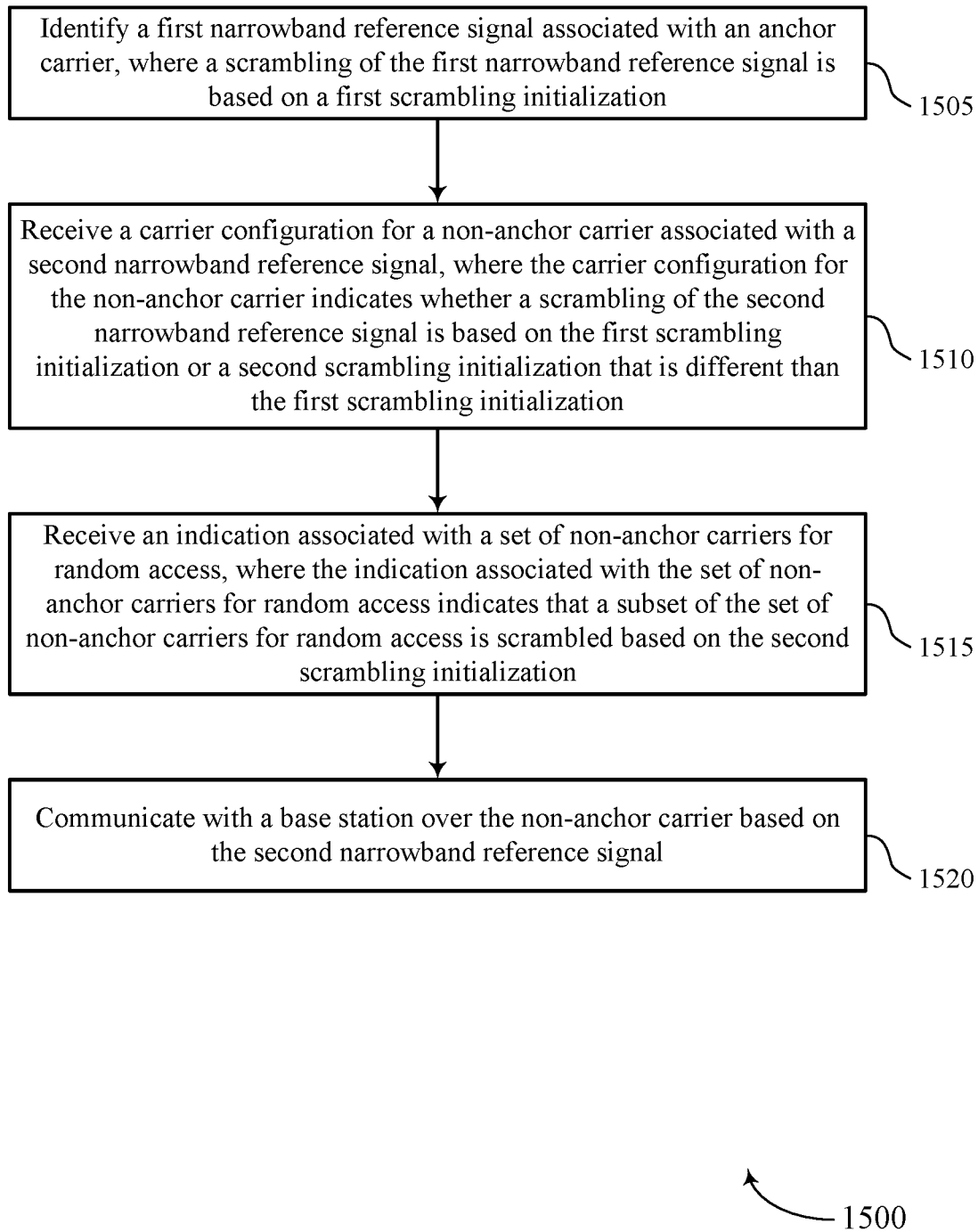

FIG. 15 shows a flowchart illustrating a method 1500 that supports narrowband reference signal configuration for non-anchor carriers in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may identify a first narrowband reference signal associated with an anchor carrier, where a scrambling of the first narrowband reference signal is based on a first scrambling initialization. The operations of 1505 may be performed according to the methods described herein. In some examples, aspects of the operations of 1505 may be performed by an NRS component as described with reference to FIGS. 4 through 7.

At 1510, the UE may receive a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization. The operations of 1510 may be performed according to the methods described herein. In some examples, aspects of the operations of 1510 may be performed by a carrier configuration component as described with reference to FIGS. 4 through 7.

At 1515, the UE may receive an indication associated with a set of non-anchor carriers for random access, where the indication associated with the set of non-anchor carriers for random access indicates that a subset of the set of non-anchor carriers for random access is scrambled based on the second scrambling initialization. The operations of 1515 may be performed according to the methods described herein. In some examples, aspects of the operations of 1515 may be performed by a carrier configuration component as described with reference to FIGS. 4 through 7.

At 1520, the UE may communicate with a base station over the non-anchor carrier based on the second narrowband reference signal. The operations of 1520 may be performed according to the methods described herein. In some examples, aspects of the operations of 1520 may be performed by a non-anchor carrier communication component as described with reference to FIGS. 4 through 7.

Figure 16:
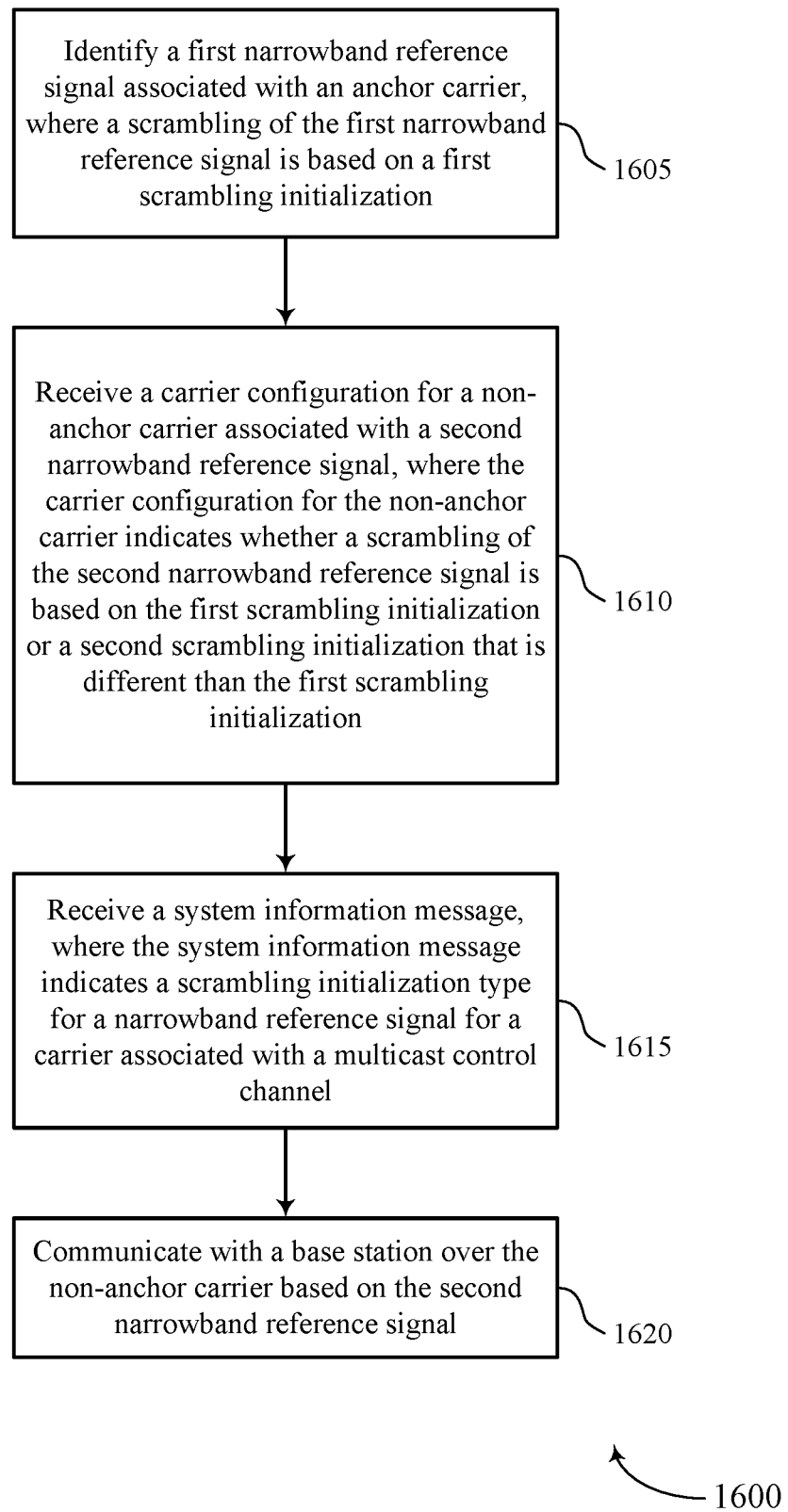

FIG. 16 shows a flowchart illustrating a method 1600 that supports narrowband reference signal configuration for non-anchor carriers in accordance with aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1605, the UE may identify a first narrowband reference signal associated with an anchor carrier, where a scrambling of the first narrowband reference signal is based on a first scrambling initialization. The operations of 1605 may be performed according to the methods described herein. In some examples, aspects of the operations of 1605 may be performed by an NRS component as described with reference to FIGS. 4 through 7.

At 1610, the UE may receive a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization. The operations of 1610 may be performed according to the methods described herein. In some examples, aspects of the operations of 1610 may be performed by a carrier configuration component as described with reference to FIGS. 4 through 7.

At 1615, the UE may receive a system information message, where the system information message indicates a scrambling initialization type for a narrowband reference signal for a carrier associated with a multicast control channel. The operations of 1615 may be performed according to the methods described herein. In some examples, aspects of the operations of 1615 may be performed by a system information component as described with reference to FIGS. 4 through 7.

At 1620, the UE may communicate with a base station over the non-anchor carrier based on the second narrowband reference signal. The operations of 1620 may be performed according to the methods described herein. In some examples, aspects of the operations of 1620 may be performed by a non-anchor carrier communication component as described with reference to FIGS. 4 through 7.

Figure 17:
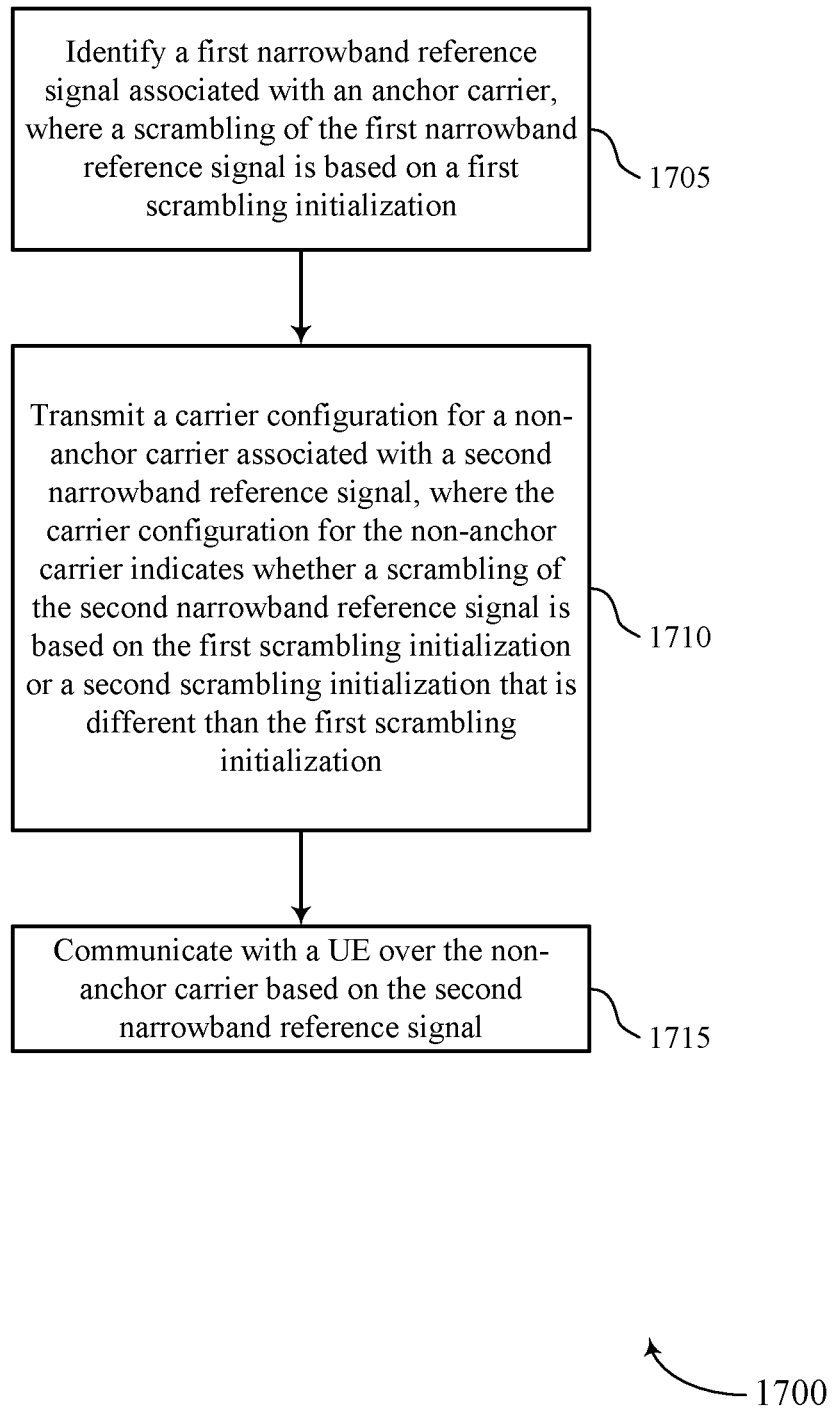

FIG. 17 shows a flowchart illustrating a method 1700 that supports narrowband reference signal configuration for non-anchor carriers in accordance with aspects of the present disclosure. The operations of method 1700 may be implemented by a base station 105 or its components as described herein. For example, the operations of method 1700 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1705, the base station may identify a first narrowband reference signal associated with an anchor carrier, where a scrambling of the first narrowband reference signal is based on a first scrambling initialization. The operations of 1705 may be performed according to the methods described herein. In some examples, aspects of the operations of 1705 may be performed by an NRS component as described with reference to FIGS. 8 through 11.

At 1710, the base station may transmit a carrier configuration for a non-anchor carrier associated with a second narrowband reference signal, where the carrier configuration for the non-anchor carrier indicates whether a scrambling of the second narrowband reference signal is based on the first scrambling initialization or a second scrambling initialization that is different than the first scrambling initialization. The operations of 1710 may be performed according to the methods described herein. In some examples, aspects of the operations of 1710 may be performed by a carrier configuration component as described with reference to FIGS. 8 through 11.

At 1715, the base station may communicate with a UE over the non-anchor carrier based on the second narrowband reference signal. The operations of 1715 may be performed according to the methods described herein. In some examples, aspects of the operations of 1715 may be performed by a non-anchor carrier communication component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying a first narrowband reference signal associated with an anchor carrier, wherein a scrambling of the first narrowband reference signal is based at least in part on a first scrambling initialization;
   transmitting a capability message indicating a capability to support a scrambling of a second narrowband reference signal based at least in part on a second scrambling initialization that is different than the first scrambling initialization;
   receiving, based at least in part on the capability message, a carrier configuration for a non-anchor carrier associated with the second narrowband reference signal, wherein the carrier configuration for the non-anchor carrier indicates whether the scrambling of the second narrowband reference signal is based at least in part on the first scrambling initialization or the second scrambling initialization; and
   communicating with a base station over the non-anchor carrier based at least in part on the second narrowband reference signal.

2. The method of claim 1, further comprising:
   receiving an indication associated with a set of non-anchor carriers for paging, wherein the indication associated with the set of non-anchor carriers for paging indicates that a subset of the set of non-anchor carriers for paging is scrambled based at least in part on the second scrambling initialization.

3. The method of claim 2, further comprising:
   selecting a non-anchor carrier for paging from the set of non-anchor carriers for paging based at least in part on a UE capability, a scrambling initialization type of the non-anchor carrier for paging, an identifier of the UE, or a combination thereof.

4. The method of claim 1, further comprising:
   receiving an indication associated with a set of non-anchor carriers for random access, wherein the indication associated with the set of non-anchor carriers for random access indicates that a subset of the set of non-anchor carriers for random access is scrambled based at least in part on the second scrambling initialization.

5. The method of claim 4, further comprising:
selecting a non-anchor carrier for random access from the set of non-anchor carriers for random access based at least in part on a UE capability.

6. The method of claim 1, further comprising:
receiving a system information message, wherein the system information message indicates a scrambling initialization type for a narrowband reference signal for a carrier associated with a multicast control channel.

7. The method of claim 6, further comprising:
receiving an indication associated with the multicast control channel, wherein the indication associated with the multicast control channel indicates a scrambling initialization type for a narrowband reference signal for a non-anchor carrier associated with a multicast traffic channel.

8. The method of claim 1, wherein the non-anchor carrier comprises an aggregation of two physical resource blocks, and wherein the carrier configuration for the non-anchor carrier indicates the scrambling of the second narrowband reference signal by configuring the non-anchor carrier as an aggregation of two physical resource blocks.

9. The method of claim 8, wherein:
a first physical resource block of the non-anchor carrier is associated with a narrowband reference signal having a scrambling based at least in part on the first scrambling initialization; and
a second physical resource block of the non-anchor carrier is associated with a narrowband reference signal having a scrambling based at least in part on the second scrambling initialization.

10. The method of claim 8, wherein a first physical resource block and a second physical resource block of the non-anchor carrier is associated with a narrowband reference signal having a scrambling based at least in part on the second scrambling initialization.

11. The method of claim 10, wherein the second scrambling initialization is initialized once per symbol and mapped to the narrowband reference signal on both physical resource blocks.

12. The method of claim 10, wherein the second scrambling initialization is initialized separately for each physical resource block based at least in part on a carrier identifier and mapped separately for each physical resource block.

13. The method of claim 1, further comprising:
receiving the second narrowband reference signal, wherein a scrambling of the second narrowband reference signal is based at least in part on the second scrambling initialization.

14. The method of claim 1, wherein the second scrambling initialization is based at least in part on a system frame number.

15. The method of claim 1, wherein the first scrambling initialization is associated with a first periodicity and the second scrambling initialization is associated with a second periodicity, wherein the second periodicity is greater than the first periodicity.

16. A method for wireless communications at a network entity, comprising:
identifying a first narrowband reference signal associated with an anchor carrier, wherein a scrambling of the first narrowband reference signal is based at least in part on a first scrambling initialization;

receiving a capability message indicating a capability to support a scrambling of a second narrowband reference signal based at least in part on a second scrambling initialization that is different than the first scrambling initialization;
transmitting, based at least in part on the capability message, a carrier configuration for a non-anchor carrier associated with the second narrowband reference signal, wherein the carrier configuration for the non-anchor carrier indicates whether the scrambling of the second narrowband reference signal is based at least in part on the first scrambling initialization or the second scrambling initialization; and
communicating with a user equipment (UE) over the non-anchor carrier based at least in part on the second narrowband reference signal.

17. The method of claim 16, further comprising:
broadcasting an indication associated with a set of non-anchor carriers for paging, wherein the indication associated with the set of non-anchor carriers for paging indicates that a subset of the set of non-anchor carriers for paging is scrambled based at least in part on the second scrambling initialization.

18. The method of claim 16, further comprising:
broadcasting an indication associated with a set of non-anchor carriers for random access, wherein the indication associated with the set of non-anchor carriers for random access indicates that a subset of the set of non-anchor carriers for random access is scrambled based at least in part on the second scrambling initialization.

19. The method of claim 16, further comprising:
broadcasting a system information message, wherein the system information message indicates a scrambling initialization type for a narrowband reference signal for a carrier associated with a multicast control channel.

20. The method of claim 19, further comprising:
transmitting an indication associated with the multicast control channel, wherein the indication associated with the multicast control channel indicates a scrambling initialization type for a narrowband reference signal for a non-anchor carrier associated with a multicast traffic channel.

21. The method of claim 16, wherein the non-anchor carrier comprises an aggregation of two physical resource blocks, and wherein the carrier configuration for the non-anchor carrier indicates the scrambling of the second narrowband reference signal by configuring the non-anchor carrier as an aggregation of two physical resource blocks.

22. The method of claim 21, wherein:
a first physical resource block of the non-anchor carrier is associated with a narrowband reference signal having a scrambling based at least in part on the first scrambling initialization; and
a second physical resource block of the non-anchor carrier is associated with a narrowband reference signal having a scrambling based at least in part on the second scrambling initialization.

23. The method of claim 21, wherein a first physical resource block and a second physical resource block of the non-anchor carrier is associated with a narrowband reference signal having a scrambling based at least in part on the second scrambling initialization.

24. The method of claim 23, wherein the second scrambling initialization is initialized once per symbol and mapped to the narrowband reference signal on both physical resource blocks.

25. The method of claim 23, wherein the second scrambling initialization is initialized separately for each physical resource block based at least in part on a carrier identifier and mapped separately for each physical resource block.

26. The method of claim 16, further comprising:
transmitting the second narrowband reference signal, wherein a scrambling of the second narrowband reference signal is based at least in part on the second scrambling initialization.

27. An apparatus for wireless communications at a user equipment (UE), comprising:
a processor,
memory coupled with the processor; and
instructions stored in the memory and executable by the processor to cause the apparatus to:
identify a first narrowband reference signal associated with an anchor carrier, wherein a scrambling of the first narrowband reference signal is based at least in part on a first scrambling initialization;
transmit a capability message indicating a capability to support a scrambling of a second narrowband reference signal based at least in part on a second scrambling initialization that is different than the first scrambling initialization;
receive, based at least in part on the capability message, a carrier configuration for a non-anchor carrier associated with the second narrowband reference signal, wherein the carrier configuration for the non-anchor carrier indicates whether the scrambling of the second narrowband reference signal is based at least in part on the first scrambling initialization or the second scrambling initialization; and
communicate with a base station over the non-anchor carrier based at least in part on the second narrowband reference signal.

28. An apparatus for wireless communications at a network entity, comprising:
a processor,
memory coupled with the processor; and
instructions stored in the memory and executable by the processor to cause the apparatus to:
identify a first narrowband reference signal associated with an anchor carrier, wherein a scrambling of the first narrowband reference signal is based at least in part on a first scrambling initialization;
receive a capability message indicating a capability to support a scrambling of a second narrowband reference signal based at least in part on a second scrambling initialization that is different than the first scrambling initialization;
transmit, based at least in part on the capability message, a carrier configuration for a non-anchor carrier associated with the second narrowband reference signal, wherein the carrier configuration for the non-anchor carrier indicates whether the scrambling of the second narrowband reference signal is based at least in part on the first scrambling initialization or the second scrambling initialization; and
communicate with a user equipment (UE) over the non-anchor carrier based at least in part on the second narrowband reference signal.

* * * * *